(12) United States Patent
Miyamoto et al.

(10) Patent No.: US 11,317,484 B2
(45) Date of Patent: Apr. 26, 2022

(54) LOAD CONTROL SYSTEM

(71) Applicant: Panasonic Intellectual Property Management Co., Ltd., Osaka (JP)

(72) Inventors: Kengo Miyamoto, Osaka (JP); Shogo Kajiwara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/262,294

(22) PCT Filed: Jul. 22, 2019

(86) PCT No.: PCT/JP2019/028611
§ 371 (c)(1),
(2) Date: Jan. 22, 2021

(87) PCT Pub. No.: WO2020/022249
PCT Pub. Date: Jan. 30, 2020

(65) Prior Publication Data
US 2021/0274611 A1 Sep. 2, 2021

(30) Foreign Application Priority Data
Jul. 27, 2018 (JP) .............................. JP2018-141596

(51) Int. Cl.
*H05B 45/10* (2020.01)
*H05B 45/40* (2020.01)
(Continued)

(52) U.S. Cl.
CPC ............ *H05B 45/10* (2020.01); *H02M 5/293* (2013.01); *H02M 7/06* (2013.01); *H05B 45/315* (2020.01); *H05B 45/40* (2020.01)

(58) Field of Classification Search
CPC ...... H05B 45/37; H05B 45/39; H05B 45/375; H05B 45/382
See application file for complete search history.

(56) References Cited

U.S. PATENT DOCUMENTS

2008/0111501 A1* 5/2008 Dobbins .............. H05B 47/185
315/294
2009/0039854 A1* 2/2009 Blakeley ................ H05B 39/08
323/285
(Continued)

FOREIGN PATENT DOCUMENTS

| JP | 2000-223284 A | 8/2000 |
| JP | 2013-149495 A | 8/2013 |
| WO | 2016/199368 A1 | 12/2016 |

OTHER PUBLICATIONS

Office Action for corresponding Indian Application No. 202117002432 dated May 31, 2021, with English language translation.
(Continued)

*Primary Examiner* — Tung X Le
(74) *Attorney, Agent, or Firm* — Renner, Otto, Boisselle & Sklar, LLP

(57) ABSTRACT

In a load control system as described, each of a plurality of switch circuits includes a switch electrically connected between an associated one second terminal out of a plurality of second terminals and a first terminal. A control circuit controls the switch that each of the plurality of switch circuits includes and thereby controls supply of power to a load associated with each of the plurality of switch circuits. A power supply circuit is electrically connected between the plurality of second terminals and the first terminal and receives power from a power supply via the first terminal and at least one second terminal out of the plurality of second terminals and thereby generates power to be supplied to at least the control circuit.

17 Claims, 15 Drawing Sheets

(51) Int. Cl.
     *H05B 45/315*     (2020.01)
     *H02M 5/293*     (2006.01)
     *H02M 7/06*      (2006.01)

(56) References Cited

U.S. PATENT DOCUMENTS

| | | | |
|---|---|---|---|
| 2009/0160352 A1* | 6/2009 | Nishida | H05B 41/3921 315/276 |
| 2015/0366014 A1* | 12/2015 | Itoh | H05B 45/3725 315/200 R |
| 2015/0381068 A1 | 12/2015 | Newman, Jr. et al. | |
| 2016/0344184 A1* | 11/2016 | Sundara Moorthy | H02J 3/00 |
| 2018/0153021 A1 | 5/2018 | Gotou | |
| 2018/0210481 A1* | 7/2018 | Newman, Jr. | H02M 5/297 |
| 2019/0090326 A1 | 3/2019 | Gotou | |
| 2020/0154539 A1* | 5/2020 | Moorthy | H05B 39/044 |
| 2020/0221556 A1 | 7/2020 | Gotou | |

OTHER PUBLICATIONS

International Search Report for corresponding Application No. PCT/JP2019/028611, dated Oct. 15, 2019.
Written Opinion for corresponding Application No. PCT/JP2019/028611, dated Oct. 15, 2019.

* cited by examiner

LOAD CONTROL SYSTEM

TECHNICAL FIELD

The present disclosure generally relates to a load control system, and more particularly relates to a load control system for controlling a load.

BACKGROUND ART

A dimmer for controlling the dimming level of a lighting load has been known in the art (see, for example, Patent Literature 1).

The dimmer of Patent Literature 1 includes a pair of terminals, a control circuit section, and a control power supply section for supplying control power to the control circuit section.

Between the pair of terminals, the control circuit section and the control power supply section are connected together in parallel. In addition, a series circuit of an AC power supply and the lighting load is also connected between the terminals. The lighting load includes a plurality of light-emitting diode (LED) elements and a power supply circuit for turning the respective LED elements ON. The power supply circuit includes a smoothing circuit including a diode and an electrolytic capacitor.

The control circuit section includes: a switching unit for performing phase control on an AC voltage to be supplied to the lighting load; a switch driving unit for driving the switching unit; and a control unit for controlling the switch driving unit and the control power supply section.

The control power supply section is connected to the switching unit in parallel. The control power supply section converts the AC voltage of the AC power supply into control power. The control power supply section includes an electrolytic capacitor for storing the control power.

The control unit is supplied with the control power from the control power supply section (power supply unit) via the electrolytic capacitor. The control unit performs reverse phase control for cutting off the supply of power to the lighting load in the middle of a period corresponding to each half cycle of the AC voltage according to a dimming level set by a dimming operating unit.

In the dimmer (load control system) of Patent Literature 1, the AC power supply and the lighting load are connected between the pair of terminals, thus reducing the number of electric wires compared to a situation where the AC power supply and the lighting load are each connected with two electric wires. However, if the AC power supply and a plurality of loads are connected together in series between the pair of terminals, the dimmer cannot control the plurality of loads on an individual basis.

CITATION LIST

Patent Literature

Patent Literature 1: JP 2013-149495 A

SUMMARY OF INVENTION

It is therefore an object of the present disclosure to provide a load control system with the ability to control a plurality of loads on an individual basis.

A load control system according to an aspect of the present disclosure includes a first terminal, a plurality of second terminals, a plurality of switch circuits, a control circuit, and a power supply circuit. The first terminal is configured to be electrically connected to a power supply. The plurality of second terminals are associated one to one with a plurality of loads. Each of the plurality of second terminals is configured to be electrically connected to the power supply via an associated one of the plurality of loads. The plurality of switch circuits are associated one to one with the plurality of second terminals. Each of the plurality of switch circuits includes a switch electrically connected between the first terminal and an associated one of the plurality of second terminals. The control circuit is configured to control the switch that each of the plurality of switch circuits includes and thereby control supply of power to the load associated with each of the plurality of switch circuits. The power supply circuit is electrically connected between the plurality of second terminals and the first terminal and configured to receive power from the power supply via the first terminal and at least one of the plurality of second terminals and thereby generate power to be supplied to at least the control circuit.

BRIEF DESCRIPTION OF DRAWINGS

FIG. 3 illustrates how the load control system operates to turn one load ON;

FIG. 5 illustrates how the load control system operates to turn two loads ON;

DESCRIPTION OF EMBODIMENTS

Embodiments

(1) Overview

Figure 1:
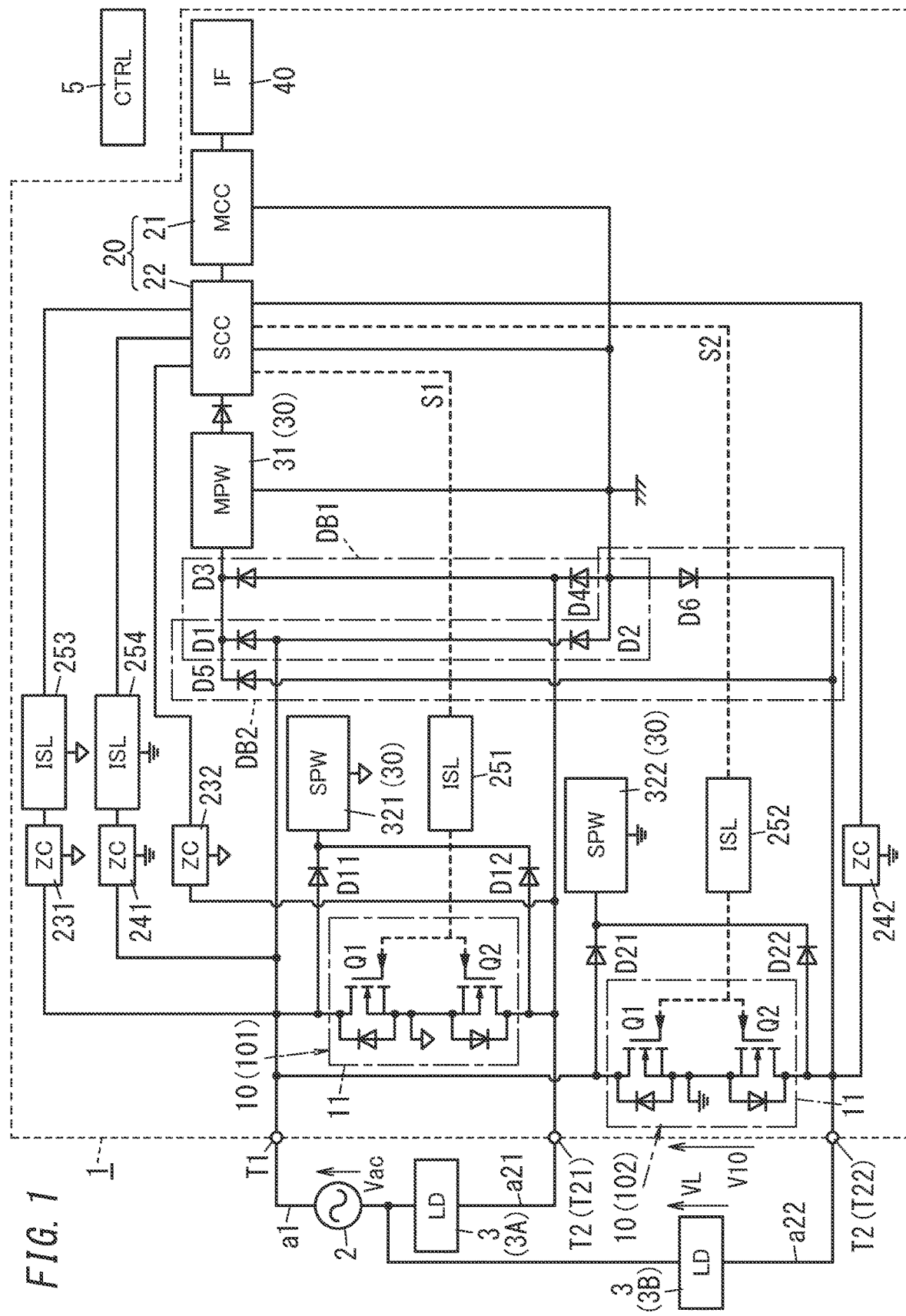
FIG. 1 is a schematic circuit diagram of a load control system according to an exemplary embodiment of the present disclosure.
Figure 2:
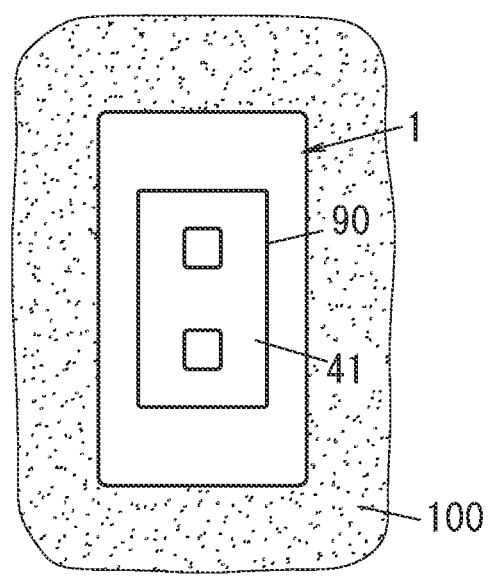
FIG. 2 is a front view of the load control system.

As shown in FIG. 1, a load control system 1 according to an exemplary embodiment includes a first terminal T1, a plurality of (e.g., two) second terminals T2 (T21, T22), a plurality of (e.g., two) switch circuits 10 (101, 102), a control circuit 20, and a power supply circuit 30.

The first terminal T1 is electrically connected to a power supply (AC power supply 2).

The plurality of second terminals T2 (T21, T22) are associated one to one with a plurality of (e.g., two) loads 3 (3A, 3B). Each of the plurality of second terminals T2 (T21, T22) is electrically connected to the power supply (AC power supply 2) via an associated one load 3 out of the plurality of loads 3 (3A, 3B). Note that in FIG. 1 and other circuit diagrams, the loads are designated by "LD" for the sake of simplicity.

The plurality of switch circuits 10 (101, 102) are associated one to one with the plurality of second terminals T2 (T21, T22). Each of the plurality of switch circuits 10 (101, 102) includes a switch 11 electrically connected between an associated one second terminal T2 out of the plurality of second terminals T2 (T21, T22) and the first terminal T1.

The control circuit 20 controls the switch 11 that each of the plurality of switch circuits 10 (101, 102) includes and thereby controls supply of power to the load 3 (3A, 3B) associated with each of the plurality of switch circuits 10 (101, 102).

The power supply circuit 30 is electrically connected between the plurality of second terminals T2 (T21, T22) and the first terminal T1. The power supply circuit 30 receives power from the power supply (AC power supply 2) via at least one second terminal T2 out of the plurality of second terminals T2 (T21, T22) and the first terminal T1 and thereby generates power to be supplied to at least the control circuit 20.

As used herein, the "first terminal" and "second terminal" do not have to be parts (terminals) to which cables and other electric wires are connected but may also be, for example, leads of an electronic part or a part of a conductor included in a circuit board.

A load control system 1 according to this embodiment is a two-wire load controller with respect to each of a plurality of loads 3 (3A, 3B). The plurality of switch circuits 10 (101, 102) are associated one to one with the plurality of loads 3 (3A, 3B). Each of the plurality of switch circuits 10 (101, 102) is electrically connected between the power supply (AC power supply 2) and an associated one of the loads 3 such that each switch circuit 10 (101, 102) is electrically connected in series to the associated load 3 (3A, 3B) with respect to the power supply (AC power supply 2).

In other words, to electrically connect the load 3A to the switch circuit 101, an electric wire a1 leading to the power supply (AC power supply 2) is electrically connected to the first terminal T1 of the load control system 1 and another electric wire a21 leading to the load 3A is electrically connected to the second terminal T21. In addition, the switch 11 that the switch circuit 101 includes is electrically connected between the two electric wires a1, a21. Thus, if the control circuit 20 makes the switch 11 of the switch circuit 101 electrically conductive, an AC voltage Vac supplied from the power supply (AC power supply 2) is applied to the load 3A, thus supplying the load 3A with power. On the other hand, if the control circuit 20 makes the switch 11 of the switch circuit 101 electrically non-conductive, the AC voltage Vac supplied from the power supply (AC power supply 2) is applied between the first terminal T1 and the second terminal T21, thus stopping the supply of power to the load 3A.

Meanwhile, to electrically connect the load 3B to the switch circuit 102, the electric wire a1 leading to the power supply (AC power supply 2) is electrically connected to the first terminal T1 of the load control system 1 and another electric wire a22 leading to the load 3B is electrically connected to the second terminal T22. In addition, the switch 11 that the switch circuit 102 includes is electrically connected between the two electric wires a1, a22. Thus, if the control circuit 20 makes the switch 11 of the switch circuit 102 electrically conductive, the AC voltage Vac supplied from the AC power supply 2 is applied to the load 3B, thus supplying the load 3B with power. On the other hand, if the control circuit 20 makes the switch 11 of the switch circuit 102 electrically non-conductive, the AC voltage Vac supplied from the AC power supply 2 is applied between the first terminal T1 and the second terminal T22, thus stopping the supply of power to the load 3B.

In this configuration, between each of the plurality of second terminals T2 and the first terminal T1, the load 3 and the AC power supply 2 are connected in series. This reduces the number of electric wires to connect the plurality of loads 3, compared to connecting each of the plurality of loads 3 to the AC power supply 2 via two electric wires.

In addition, the control circuit 20 controls the supply of power to the load 3 associated each of the switch circuits 10 by controlling the switch 11 of each switch circuit 10, thus allowing the supply of power to the plurality of loads 3 to be controlled on an individual basis.

Furthermore, the power supply circuit 30 is electrically connected between the plurality of second terminals T2 and the first terminal T1, and therefore, may receive power from the power supply (AC power supply 2) via an any one second terminal T2 out of the plurality of second terminals T2 and the first terminal T1. Thus, even if any of the plurality of second terminals T2 falls into no-load conditions, the power supply circuit 30 may still receive power from the power supply (AC power supply 2) via the rest of the second terminals T2 other than the second terminal T2 that has fallen into no-load conditions and the first terminal T1. This allows, even if any of the plurality of second terminals T2 has fallen into no-load conditions, the power supply circuit 30 to still supply voltage required to operate the control circuit 20, thus providing a two-wire load control system 1 with the ability to control the plurality of loads 3 on an individual basis.

In the following description of exemplary embodiments, each of the loads 3 is supposed to be a lighting load including a plurality of LED elements and a lighting circuit for turning the plurality of LED elements ON. That is to say, the load control system 1 may be implemented as, for example, a dimmer for regulating the magnitude of optical output of the load 3 by making the switch 11 perform phase control on the voltage to be supplied to the load 3 that is the lighting load. In this case, the lighting circuit of the load 3 detects the dimming level based on the waveform of the AC voltage Vac, on which phase control is performed by the load control system 1 and varies the magnitude of optical output of the LED elements accordingly. The lighting circuit of the load 3 includes a current-path-providing circuit such as a bleeder circuit, for example. This allows, even in a period in which the switch 11 of the load control system 1 becomes electrically non-conductive, a current to flow through the load 3. The AC power supply 2 may be a single-phase 100 V, 60 Hz commercial power supply. The load control system 1 is applicable to a wall switch, for example.

(2) Details

The load control system 1 according to an exemplary embodiment will be described in detail with reference to FIGS. 1-6.

As shown in FIG. 1, the load control system 1 includes the first terminal T1, the plurality of (e.g., two) second terminals T2 (T21, T22), the plurality of (e.g., two) switch circuits 10 (101, 102), the control circuit 20, and the power supply circuit 30. The load control system 1 further includes rectifier circuits DB1, DB2, an interface unit 40, zero-crossing (ZC) detection units 231, 232, 241, 242, and insulating circuits 251-254. Furthermore, in this embodiment, the control circuit 20 includes a main control circuit 21 and a sub-control circuit 22, both of which are common circuits. The power supply circuit 30 includes a main power supply circuit 31, which is used as a common circuit, and a plurality of sub-power supply circuits 321, 322. That is to say, in this embodiment, each of the control circuit 20 and the power supply circuit 30 includes at least one common circuit. As used herein, the common circuit is a circuit to be used in common by the plurality of switch circuits 10. In this embodiment, the plurality of switch circuits 10 use the common circuits in common, thus reducing the circuit scale of the load control system 1 as a whole. Note that not both of the control circuit 20 and the power supply circuit 30 have to include the common circuits. Alternatively, only either the control circuit 20 or the power supply circuit 30 may include a common circuit. Still alternatively, neither the control circuit 20 nor the power supply circuit 30 may include any common circuits. In FIG. 1 and other circuit diagrams, the main control circuit is abbreviated as "MCC," the sub-control circuit is abbreviated as "SCC," the main power supply circuit is abbreviated as "MPW," the sub-power supply circuits are abbreviated as "SPW," the interface unit is abbreviated as "IF," the insulating circuits are abbreviated as "ISL," and the zero-crossing detection units are abbreviated as "ZC."

As described above, each of the plurality of switch circuits 10 (101, 102) includes the switch 11 electrically connected between an associated one second terminal T2 out of the plurality of second terminals T2 (T21, T22) and the first terminal T1.

The switch 11 may include, for example, two switching elements Q1, Q2 which are electrically connected together in series between the first terminal T1 and the second terminal T2 (T21, T22). Each of the switching elements Q1, Q2 may be a semiconductor switching element implemented as a metal-oxide semiconductor field-effect transistor (MOSFET), for example.

The switching elements Q1, Q2 are connected in so-called "anti-series" between the first terminal T1 and the second terminal T2 (T21, T22). That is to say, the switching elements Q1, Q2 have their sources connected together. The drain of the switching element Q1 is connected to the first terminal T1 and the drain of the switching element Q2 is connected to the second terminal T2. In this embodiment, the respective sources of the switching elements Q1, Q2 that the switch circuit 101 includes are electrically connected to the ground of the sub-power supply circuit 321 provided for the switch circuit 101 such that gate driving voltage is supplied from the sub-power supply circuit 321 to the switch circuit 101. Likewise, the respective sources of the switching elements Q1, Q2 that the switch circuit 102 includes are electrically connected to the ground of the sub-power supply circuit 322 provided for the switch circuit 102 such that gate driving voltage is supplied from the sub-power supply circuit 322 to the switch circuit 102.

The switch 11 of each switch circuit 10 is switchable from one of four states to another according to the combination of ON/OFF states of the switching elements Q1, Q2. Each of the switching elements Q1, Q2 has its state controlled by the control circuit 20 to either ON state or OFF state. In this case, the four states include: a "bidirectionally OFF state" in which the two switching elements Q1, Q2 are both OFF; a "bidirectionally ON state" in which the two switching elements Q1, Q2 are both ON; and two "unidirectionally ON states" in each of which only either the switching element Q1 or the switching element Q1 is ON. In the unidirectionally ON state, the electrical path between the first terminal T1 and the second terminal T2 becomes electrically continuous unidirectionally from an ON-state one of the switching elements Q1, Q2 and through a parasitic diode of the OFF state one of the switching elements Q1, Q2. For example, in a state where the switching element Q1 is ON and the switching element Q2 is OFF, a "first unidirectionally ON state" in which a current is caused to flow from the first terminal T1 toward the second terminal T2 is established. On the other hand, in a state where the switching element Q2 is ON and the switching element Q1 is OFF, a "second unidirectionally ON state" in which a current is caused to flow from the second terminal T2 toward the first terminal T1 is established. Thus, when the AC voltage Vac supplied from the AC power supply 2 is applied between the first terminal T1 and the second terminal T2, in a half cycle in which the AC voltage Vac is positive (i.e., the first terminal T1 has positive polarity), the first unidirectionally ON state is a "forward ON state" and the second unidirectionally ON state is a "backward ON state." On the other hand, in a half cycle in which the AC voltage Vac is negative (i.e., the second terminal T2 has positive polarity), the second unidirectionally ON state is a "forward ON state" and the first unidirectionally ON state is a "backward ON state."

In this case, each of the "bidirectionally ON state" and "forward ON state" of the switch 11 is an "electrically conductive state" in which a current flows through the load 3 (3A, 3B) via the switch 11, and each of the "bidirectionally OFF state" and "backward ON state" of the switch 11 is an "electrically non-conductive state" in which no current flows through the load 3 (3A, 3B) via the switch 11. According to this embodiment, having the control circuit 20 control each of the switching elements Q1, Q2 to either ON state or OFF state in either a half-cycle in which the AC voltage Vac is positive or a half-cycle in which the AC voltage Vac is negative allows the switch 11 to be controlled to either the "electrically conductive state" or the "electrically non-conductive state."

The zero-crossing detection units 231, 232 each detects a zero-crossing point of the AC voltage Vac applied between the first terminal T1 and the second terminal T21.

The zero-crossing detection unit 231 compares the levels of the voltage at the first terminal T1 and a predetermined threshold value with each other. On detecting that voltage, of which the level is positive at the first terminal T1, has changed from a value less than the threshold value to a value equal to or greater than the threshold value, the zero-crossing detection unit 231 determines that a zero-crossing point has been passed at which the AC voltage Vac makes a transition from a half-cycle with negative polarity to a half-cycle with positive polarity and outputs a detection signal. The detection signal output from the zero-crossing detection unit 231 is provided to the sub-control circuit 22 via the insulating circuit 253 that electrically insulates the zero-crossing detection unit 231 from the sub-control circuit 22. Optionally, a circuit for outputting the detection signal of the zero-crossing detection unit 231 as a short-pulse signal may be electrically connected between the zero-crossing detection unit 231 and the insulating circuit 253. The insulating circuit 253 electrically insulates the input from the output using an optical transmitter such as a photocoupler. Alternatively, the insulating circuit 253 may also electrically insulate the input from the output by using an electromagnetic transmitter such as a transformer.

Also, on detecting that voltage, of which the level is positive at the second terminal T21, has changed from a value less than the threshold value to a value equal to or greater than the threshold value, the zero-crossing detection unit 232 determines that a zero-crossing point has been passed at which the AC voltage Vac makes a transition from a half-cycle with positive polarity to a half-cycle with negative polarity. On detecting the zero-crossing point at which the AC voltage Vac makes a transition from a half-cycle with positive polarity to a half-cycle with negative polarity, the zero-crossing detection unit 232 outputs a detection signal to the sub-control circuit 22. As used herein, the threshold value is a value (absolute value) set in the vicinity of 0 V. For example, the threshold value of the zero-crossing detection units 231, 232 may be on the order of a few V. Therefore, a point in time when the zero-crossing point is detected by the zero-crossing detection unit 231, 232 is slightly delayed from the zero-crossing point (of 0 V) in a strict sense.

In the same way, the zero-crossing detection unit 241, 242 detects the zero-crossing point of the AC voltage Vac applied between the first terminal T1 and the second terminal T22. On detecting the zero-crossing point, the zero-crossing detection unit 241, 242 outputs a detection signal. Since the ground of the zero-crossing detection unit 241, 242 is common with the ground of the main power supply circuit 31, the detection signal of the zero-crossing detection unit 241, 242 is directly input to the sub-control circuit 22. Optionally, between the zero-crossing detection unit 241, 242 and the sub-control circuit 22, a circuit for outputting the detection signal of the zero-crossing detection unit 241, 242 as a short pulse signal may be electrically connected.

The interface unit (operating unit) 40 receives at least one input level defining brightness for the loads 3A, 3B. Each of the input levels defines a timing when the switch 11 becomes electrically conductive or non-conductive in a half cycle of the AC voltage Vac. Note that the interface unit 40 may receive mutually different input levels or the same input level for the loads 3A, 3B. Since the load control system 1 is implemented as a dimmer according to this embodiment, the interface unit 40 accepts a dimming level as an input level entered by the user as his or her operating command. The interface unit 40 outputs a dimming level control signal representing the dimming level to the main control circuit 21. The dimming level control signal may be a numerical value specifying the magnitude of the optical output (i.e., the dimming level) of the load 3 and may include an "OFF level" that turns the load 3 OFF. In this embodiment, the interface unit 40 includes, for example, a touchscreen panel 41 (see FIG. 2) that accepts the user's touch operation. The touchscreen panel 41 is provided on the surface of the body 90 of the load control system 1 and is configured to accept the user's touch operation in a state where the body 90 of the load control system 1 is mounted onto a building component 100 such as a wall. Note that the interface unit 40 only needs to be configured to output a signal indicating the input level (dimming level) and may be, for example, a variable resistor, a rotary switch, or an operating button arranged on the surface of the body 90. Optionally, the interface unit 40 may include a plurality of operating units associated one to one with the plurality of switch circuits 10. In accordance with the operating command entered through one of the plurality of operating units, the control circuit 20 controls the ON/OFF states of the switch 11 of the switch circuit 10, associated with the one operating unit, out of the plurality of switch circuits 10. In this embodiment, the interface unit 40 is implemented as the touchscreen panel 41. After having changed the loads 3 to operate by performing a predetermined operation (e.g., operation such as slide right or slide left) on the touchscreen panel 41, the user performs another predetermined operation (such as slide (scroll) up or slide (scroll) down) on the touchscreen panel 41 to control the dimming level of the load 3 to operate. That is to say, the single touchscreen panel 41 provides a plurality of operating units corresponding one to one to the plurality of switch circuits 10. Optionally, the plurality of operating units may also be implemented as a plurality of operating buttons, for example, provided in association with the plurality of switch circuits 10. Alternatively, one operating unit corresponding to one switch circuit 10 may include a set of operating elements (such as operating buttons) for use to perform a plurality of operations on the one switch circuit 10 (including, for example, turning the light ON/OFF, turning the light UP (increasing the dimming level) and turning the light DOWN (decreasing the dimming level)).

Optionally, the interface unit 40 may further include an indicator indicating the input brightness value (dimming level) of the load 3. For example, the interface unit 40 may include an indicator including a plurality of LED elements and indicating the input level by the number of LED elements turned ON.

Next, the control circuit 20 will be described. In this embodiment, the control circuit 20 includes the main control circuit 21 and the sub-control circuit 22.

The main control circuit 21 and the sub-control circuit 22 may each include, as a principal hardware component, a microcontroller including one or more processors and one or more memories. The functions of the main control circuit 21 and sub-control circuit 22 may be performed by making the processor of the microcontroller execute a program stored in the memory of the microcontroller. The program may be stored in advance in the memory. Alternatively, the program may also be downloaded through a telecommunications line such as the Internet or be distributed after having been recorded in some non-transitory storage medium such as a memory card. In this embodiment, the main control circuit 21 and the sub-control circuit 22 are implemented as two different microcontrollers. However, this is only an example of the present disclosure and should not be construed as limiting. Alternatively, the main control circuit 21 and the sub-control circuit 22 may be implemented as a single microcontroller.

The main control circuit 21 has the communication capability of communicating with a control master device 5 by a wireless communication method. In this embodiment, the communication capability that the main control circuit 21 has may be compliant with the specified low power ratio communications protocol. However, this is only an example of the present disclosure and should not be construed as limiting. Alternatively, the main control circuit 21 may also be a communications module compliant with the communications protocol such as Bluetooth® or Wi-Fi®. In FIG. 1 and other circuit diagrams, the control master device is abbreviated as "CTRL" for the sake of simplicity.

The main control circuit 21 outputs, in accordance with a control signal received from the control master device 5, a control signal indicating the dimming level of the load 3 (3A, 3B) to control to the sub-control circuit 22. The main control circuit 21 also has the capability of accepting an operating command entered through the interface unit 40. In addition, the main control circuit 21 also outputs, in accordance with the operating command received from the interface unit 40, a control signal indicating the dimming level of the load 3 (3A, 3B) to control to the sub-control circuit 22.

In accordance with the control signal for the load 3A supplied from the main control circuit 21 and the detection signals supplied from the zero-crossing detection units 231, 232, the sub-control circuit 22 outputs a control signal S1 to the switch circuit 101, thereby controlling the ON/OFF states of the switch 11 that the switch circuit 101 includes. In this embodiment, the ground of the switch circuit 101 is not common with the ground of the sub-control circuit 22, and therefore, the control signal S1 supplied from the sub-control circuit 22 is provided to the switch circuit 101 via the insulating circuit 251. The sub-control circuit 22 controls the ON/OFF states of the switch 11 by controlling, on an individual basis, the switching elements Q1, Q2 of the switch 11 that the switch circuit 101 includes and makes the switch 11 of the switch circuit 101 perform phase control on the AC voltage Vac supplied from the AC power supply 2 to the load 3A.

In addition, in accordance with the control signal for the load 3B supplied from the main control circuit 21 and the detection signals supplied from the zero-crossing detection units 241, 242, the sub-control circuit 22 outputs a control signal S2 to the switch circuit 102, thereby controlling the ON/OFF states of the switch 11 that the switch circuit 102 includes. In this embodiment, the ground of the switch circuit 102 is not common with the ground of the sub-control circuit 22, and therefore, the control signal S2 supplied from the sub-control circuit 22 is provided to the switch circuit 102 via the insulating circuit 252. The sub-control circuit 22 controls the ON/OFF states of the switch 11 by controlling, on an individual basis, the switching elements Q1, Q2 of the switch 11 that the switch circuit 102 includes and makes the switch 11 of the switch circuit 102 perform phase control on the AC voltage Vac supplied from the AC power supply 2 to the load 3B.

As used herein, the "phase control" refers to a method of controlling the AC voltage Vac to be supplied (applied) to the load 3 by changing, every half cycle of the AC voltage Vac, a phase angle (conduction angle) at which the load 3 starts to be energized and a phase angle at which the load 3 finishes being energized. In this embodiment, the sub-control circuit 22 performs "reverse phase control" in which the supply of power to the load 3A, 3B is cut off in the middle of a period corresponding to every half cycle of the AC voltage Vac.

In this embodiment, the load control system 1 includes the insulating circuits 251, 252, each electrically insulating its associated switch circuit 10 from the control circuit 20. Making the insulating circuit 251, 252 electrically insulate the switch circuit 10 from the control circuit 20 allows the control signal to be transmitted between the switch circuit 10 and the control circuit 20 having different ground levels. Since the control circuit 20 receives power from the power supply circuit 30, the insulating circuit 251, 252 electrically insulates the switch circuit 10 from the power supply circuit 30 by electrically insulating the switch circuit 10 from the control circuit 20. In this embodiment, the insulating circuit 251, 252 electrically insulates every switch circuit 10 from the control circuit 20. Alternatively, the insulating circuit 251, 252 may electrically insulate some of the plurality of switch circuits 10 from the control circuit 20. Still alternatively, the insulating circuit may electrically insulate at least one of the control circuit 20 or the power supply circuit 30 from at least any one of the plurality of switch circuits 10.

Next, the power supply circuit 30 will be described. The power supply circuit 30 includes the main power supply circuit 31 and the plurality of (e.g., two) sub-power supply circuits 321, 322. In this embodiment, the rectifier circuits DB1, DB2 are provided to precede the main power supply circuit 31.

The rectifier circuit DB1 is implemented as a diode bridge circuit made up of diodes D1-D4. One end of the diode D1 and one end of the diode D2 defining first input ends of the rectifier circuit DB1 are electrically connected to the first terminal T1. One end of the diode D3 and one end of the diode D4 defining second input ends of the rectifier circuit DB1 are electrically connected to the second terminal T21. The rectifier circuit DB1 full-wave rectifies the AC voltage Vac that has been input through the first terminal T1 and the second terminal T21. The DC voltage (pulsating voltage) that has been full-wave rectified by the rectifier circuit DB1 is input to the main power supply circuit 31.

The rectifier circuit DB2 is implemented as a diode bridge circuit made up of diodes D1, D2, D5, and D6. One end of the diode D1 and one end of the diode D2 are electrically connected to the first terminal T1. One end of the diode D5 and one end of the diode D6 are electrically connected to the second terminal T22. The rectifier circuit DB2 full-wave rectifies the AC voltage Vac that has been input through the first terminal T1 and the second terminal T22. The DC voltage (pulsating voltage) that has been full-wave rectified by the rectifier circuit DB2 is input to the main power supply circuit 31.

The main power supply circuit 31 is electrically connected between the first terminal T1 and the second terminal T21 via the rectifier circuit DB1. The AC voltage Vac applied between the first terminal T1 and the second terminal T21 is full-wave rectified by the rectifier circuit DB1 and the rectified voltage is input to the main power supply circuit 31. The main power supply circuit 31 is also electrically connected between the first terminal T1 and the second terminal T22 via the rectifier circuit DB2. The AC voltage Vac applied between the first terminal T1 and the second terminal T22 is full-wave rectified by the rectifier circuit DB2 and the rectified voltage is input to the main power supply circuit 31.

In this manner, the main power supply circuit 31 converts the DC voltage supplied from at least one of the rectifier circuit DB1 or the rectifier circuit DB2 into a DC voltage having a predetermined voltage value and supplies the DC voltage to the main control circuit 21, the sub-control circuit 22, and other circuits. That is to say, the power supply circuit 30 receives power from the AC power supply 2 via an arbitrary one second terminal T2 of the plurality of second terminals T2 (T21, T22) and the first terminal T1. This allows the power supply circuit 30 to receive power from any of the second terminals T2, thus enabling the load control system 1 to continue to operate. Note that in the exemplary circuit illustrated in FIG. 1, a reverse current prevention diode is connected between the main power supply circuit 31 and the sub-control circuit 22. However, this is only an example of the present disclosure and should not be construed as limiting. Alternatively, no reverse current prevention diode may be provided between the main power supply circuit 31 and the sub-control circuit 22.

In this embodiment, the main power supply circuit 31 includes a first main power supply circuit for generating voltage to be supplied to the control circuit 20 and other circuits during an ON period of the load 3 and a second main power supply circuit for generating voltage to be supplied to the control circuit 20 and other circuits during an OFF period of the load 3.

The first main power supply circuit generates voltage during an ON period of the load 3. However, when the switch circuit 10 becomes electrically conductive, the voltage between the first terminal T1 and the second terminal T2 becomes approximately equal to zero. Since the load control system 1 according to this embodiment performs reverse phase control on the load 3, the first main power supply circuit receives power from the AC power supply 2 during a period from the zero-crossing point of the AC voltage Vac to a point in time when the switch circuit 10 becomes electrically conductive, for example. The first main power supply circuit may include a charging element (such as a capacitor) to be charged with a current supplied from at least one of the rectifier circuit DB1 or the rectifier circuit DB2 during the period from the zero-crossing point of the AC voltage Vac to a point in time when the switch circuit 10 becomes electrically conductive, for example. The first main power supply circuit supplies the voltage generated across the charging element to control circuit 20 and other circuits. Note that the first main power supply circuit does not have to be such a circuit including a charging element but may be changed as appropriate.

The second main power supply circuit generates voltage to be supplied to the control circuit 20 and other circuits during an OFF period of the load 3. During the OFF period of the load 3, the AC voltage Vac is applied between the first terminal T1 and the second terminal T2 and the rectified pulsating voltage is applied from the rectifier circuits DB1, DB2 to the main power supply circuit 31. The second main power supply circuit may be a dropper power supply of a series regulator type, for example. The second main power supply circuit converts the pulsating voltage supplied from the rectifier circuits DB1, DB2 into a DC voltage with a predetermined voltage value and supplies the DC voltage thus converted to the control circuit 20 and other circuits. Note that the second main power supply circuit does not have to be a dropper power supply but may be changed as appropriate.

The plurality of (e.g., two) sub-power supply circuits 321, 322 are associated one to one with the plurality of (e.g., two) switch circuits 101, 102. Each of the sub-power supply circuits 321, 322 may be implemented as a dropper power supply of a series regulator type. However, this is only an example of the present disclosure and should not be construed as limiting. Alternatively, the sub-power supply circuits 321, 322 do not have to be dropper power supplies but may be changed as appropriate.

The sub-power supply circuit 321 is electrically connected to the first terminal T1 via the reverse current prevention diode D11 and also electrically connected to the second terminal T21 via the reverse current prevention diode D12. The sub-power supply circuit 321 receives power from the AC power supply 2 via the first terminal T1 or the second terminal T21, generates a DC voltage with a predetermined voltage value, and supplies the DC voltage thus generated to the zero-crossing detection units 231, 232, the insulating circuit 251, and other circuits.

In the same way, the sub-power supply circuit 322 is electrically connected to the first terminal T1 via the reverse current prevention diode D21 and also electrically connected to the second terminal T22 via the reverse current prevention diode D22. The sub-power supply circuit 322 receives power from the AC power supply 2 via the first terminal T1 or the second terminal T22, generates a DC voltage with a predetermined voltage value, and supplies the DC voltage thus generated to the zero-crossing detection units 241, 242, the insulating circuit 252, and other circuits.

(3) Operation

Next, it will be described with reference to FIGS. 3-6 how the load control system 1 according to this embodiment operates.

(3.1) Operation to Turn Two Loads OFF

First, it will be described how the load control system 1 operates to turn both of the loads 3A, 3B OFF in accordance with a control signal from the control master device 5 or an operating command entered through the interface unit 40.

When the main control circuit 21 outputs a control signal instructing that the loads 3A, 3B be both turned OFF to the sub-control circuit 22, the sub-control circuit 22 outputs dimming level control signals with OFF level as control signals S1, S2 to the switch circuits 101, 102, respectively. In accordance with the control signals S1, S2 supplied from the sub-control circuit 22 via the insulating circuits 251, 252, respectively, the switch circuits 101, 102 keep the switches 11 electrically non-conductive and turn the loads 3A, 3B OFF.

If the switches 11 of the switch circuits 101, 102 are electrically non-conductive, then the AC voltage Vac from the AC power supply 2 is applied across the switch 11 of the switch circuit 101 and across the switch 11 of the switch circuit 102.

In this case, the main power supply circuit 31 may receive power from the AC power supply 2 via both of the second terminals T21, T22 and the first terminal T1 (in other words, via the rectifier circuits DB1 and DB2) and may generate power to be supplied to the control circuit 20 and other circuits.

In addition, the sub-power supply circuit 321 also receives the voltage generated across the switch 11 of the switch circuit 101 and generates voltage to be supplied to the zero-crossing detection units 231, 232 and other circuits. Likewise, the sub-power supply circuit 322 also receives the voltage generated across the switch 11 of the switch circuit 102 and generates voltage to be supplied to the zero-crossing detection units 241, 242 and other circuits.

(3.2) Operation to Turn One Load ON

Figure 3:
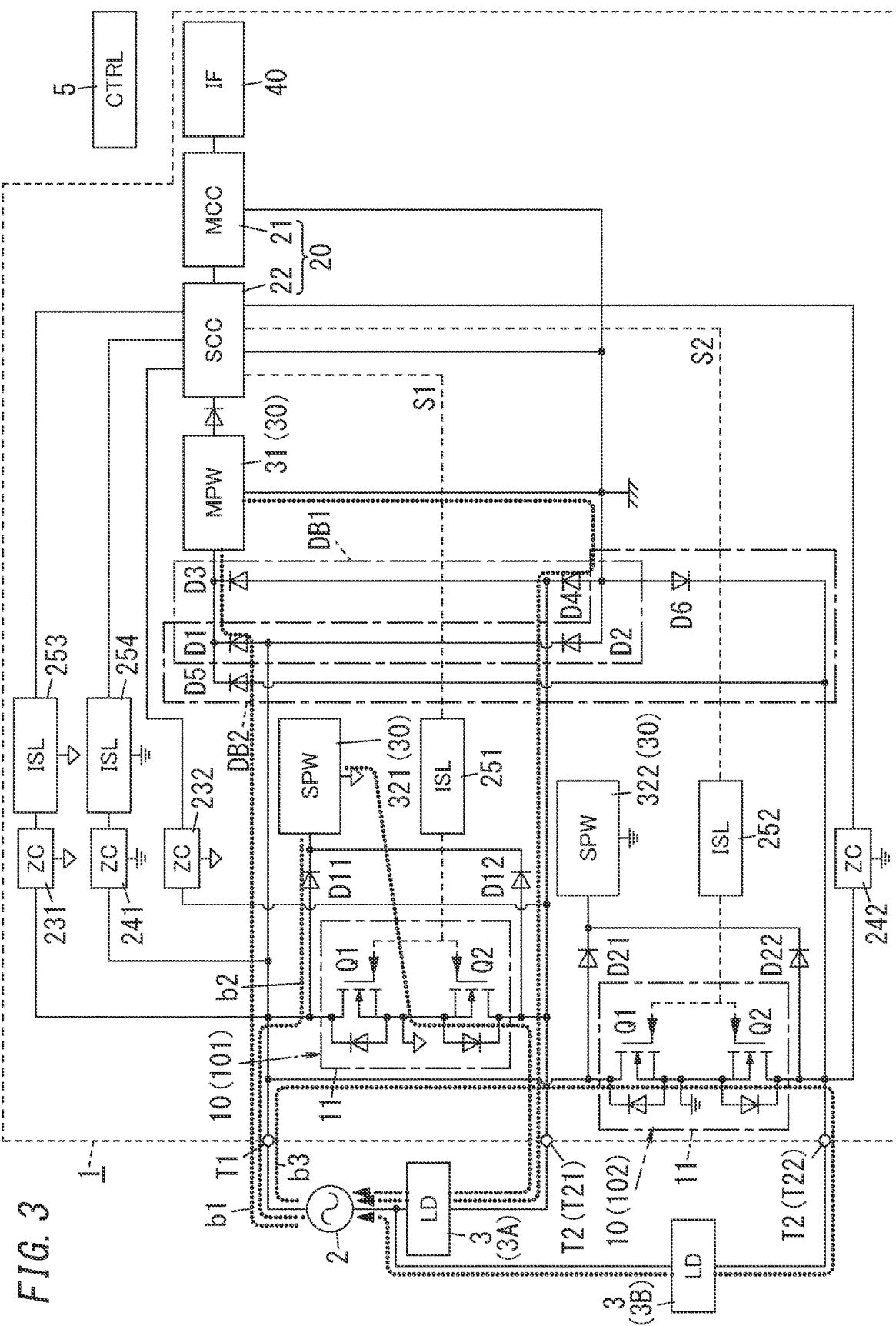
Figure 4:
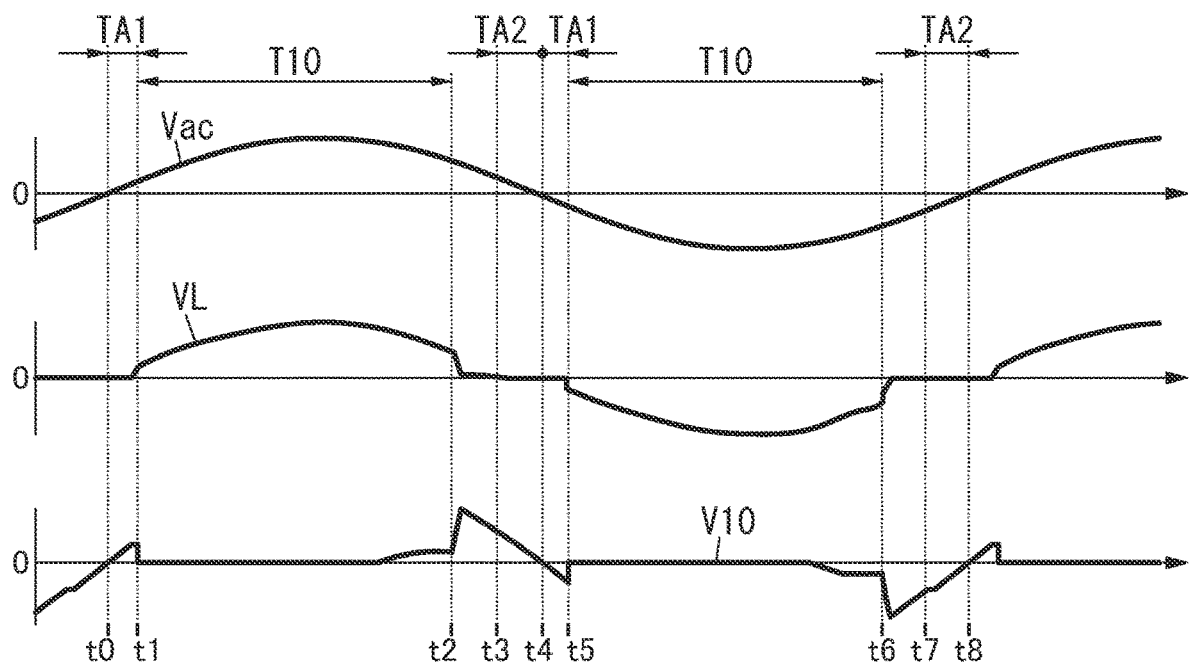
FIG. 4 is a waveform chart of respective parts of the load control system.

Next, it will be described with reference to FIGS. 3 and 4 how the main control circuit 21 turns the load 3A OFF and the load 3B ON in accordance with a control signal from the control master device 5 or an operating command entered through the interface unit 40. In FIG. 4, Vac indicates the AC voltage of the AC power supply 2, VL indicates the voltage generated across the load 3B, and V10 indicates the voltage generated across the switch circuit 102.

Before starting the processing of turning the load 3 ON, the sub-control circuit 22 determines whether or not the loads 3A, 3B are connected. For example, on receiving a detection signal from the zero-crossing detection unit 232, for example, the sub-control circuit 22 determines that the load 3A should be connected between the first terminal T1 and the second terminal T21 and outputs the decision to the main control circuit 21. On receiving a detection signal from the zero-crossing detection unit 242, for example, the sub-control circuit 22 determines that the load 3B should be connected between the first terminal T1 and the second terminal T22 and outputs the decision to the main control circuit 21. In the following description, it will be described how the sub-control circuit 22 operates when determining that the loads 3A, 3B should be both connected.

When the main control circuit 21 outputs a control signal that makes the switch 11 of the switch circuit 101 electrically non-conductive to the sub-control circuit 22 to turn the load 3A OFF, the sub-control circuit 22 outputs a control signal S1 that makes the switch 11 electrically non-conductive. On receiving the control signal S1 from the sub-control circuit 22 via the insulating circuit 251, the switch circuit 101 makes the switch 11 electrically non-conductive, thus turning the load 3A OFF.

Since the switch 11 of the switch circuit 101 is electrically non-conductive, the AC voltage Vac of the AC power supply 2 is applied across the switch 11 of the switch circuit 101. This allows the main power supply circuit 31 to receive power from the main power supply circuit 31 via the second terminal T21 and the first terminal T1 (in other words, via the rectifier circuit DB1) and generate power to be supplied to the main control circuit 21 and the sub-control circuit 22. Meanwhile, the sub-power supply circuit 321 receives the voltage generated across the switch 11 of the switch circuit 101 and performs the operation of generating voltage. In FIG. 3, the dotted line b1 indicates a path along which a current flows from the AC power supply 2 to the main power supply circuit 31 and the dotted line b2 indicates a path along which a current flows from the AC power supply 2 to the sub-power supply circuit 321.

In addition, to turn the load 3B ON with its dimming level controlled, the main control circuit 21 outputs a control signal representing the dimming level of the load 3B to the sub-control circuit 22. In accordance with the control signal supplied from the main control circuit 21 and the detection signals supplied from the zero-crossing detection unit 241, 242, the sub-control circuit 22 outputs a control signal S2 that makes the switch 11 electrically conductive or non-conductive. The control signal S2 output from the sub-control circuit 22 is provided to the switch circuit 102 via the insulating circuit 252. This makes the switch 11 of the switch circuit 102 electrically conductive at a phase angle falling within a range corresponding to the dimming level in each half cycle of the AC voltage Vac, thus turning the load 3B ON with its dimming level controlled to a desired level.

With this regard, it will be described with reference to FIGS. 3 and 4 how the load control system 1 performs the operation of controlling the dimming level of the load 3B in a half cycle in which the AC voltage Vac has positive polarity. Based on the result of detection of the zero-crossing point of the AC voltage Vac by the zero-crossing detection unit 241 in a half cycle in which the AC voltage Vac has positive polarity, the sub-control circuit 22 controls the switch 11 of the switch circuit 102 to the electrically conductive state at a timing when a first period TA1 has passed since the zero-crossing point (i.e., a point in time t0 shown in FIG. 4). The first period TA1 is a period of time that it takes for the sub-power supply circuit 322 to generate the voltage required and that elapses before the output voltage V322 of the sub-power supply circuit 322 exceeds a predetermined lower limit voltage. The sub-control circuit 22 has been provided with information about the output voltage V322 of the sub-power supply circuit 322 via the insulating circuit. On detecting that the output voltage V322 has exceeded the lower limit voltage, the sub-control circuit 22 determines that the first period TA1 should have passed since the zero-crossing point of the AC voltage Vac.

In this case, in the half cycle in which the AC voltage Vac has positive polarity, in the first period TA1 from the zero-crossing point (point in time t0) of the AC voltage Vac through a point in time t1, the switch 11 of the switch circuit 102 is electrically non-conductive and the sub-power supply circuit 322 is supplied with power from the AC power supply 2 and performs the operation of generating voltage to be supplied to the insulating circuit 252 and other circuits.

After that, at a timing when an electrically conductive period T10 corresponding to the dimming level has passed since the point in time t1 (i.e., at a point in time t2 shown in FIG. 4), the sub-control circuit 22 outputs a control signal S2 that controls the switch 11 of the switch circuit 102 to the electrically non-conductive state. As a result, in the electrically conductive period T10 from the point in time t1 through the point in time t2, power is supplied from the AC power supply 2 to the load 3B via the switch 11 of the switch circuit 102, thus turning the load 3B ON at a predetermined dimming level.

Thereafter, when the absolute value of the voltage value of the AC voltage Vac becomes less than a predetermined reference voltage (at a point in time t3 shown in FIG. 4), the sub-power supply circuit 322 performs the operation of generating voltage. The reference voltage is set at a voltage lower than a voltage value at which the load 3B may operate. As long as the absolute value of the voltage value of the AC voltage Vac is equal to or less than the reference voltage, the load 3B is not turned ON even if the sub-power supply circuit 322 performs the operation of generating voltage. This allows, even in a second period TA2 from the point in time t3 through the zero-crossing point of the AC voltage Vac (i.e., the point in time t4 shown in FIG. 4), the sub-power supply circuit 322 to be supplied with power from the AC power supply 2. Thus, the sub-power supply circuit 322 may be supplied with power from the AC power supply 2 and perform the voltage generating operation even in the second period TA2.

Next, it will be described how the load control system 1 operates in a half cycle in which the AC voltage Vac has negative polarity. Based on the result of detection of the zero-crossing point of the AC voltage Vac by the zero-crossing detection unit 242 in a half cycle in which the AC voltage Vac has negative polarity, the sub-control circuit 22 controls the switch 11 of the switch circuit 102 to the electrically conductive state at a timing (i.e., a point in time t5 shown in FIG. 4) when a first period TA1 has passed since the zero-crossing point (i.e., a point in time t4 shown in FIG. 4).

In this case, in the half cycle in which the AC voltage Vac has negative polarity, in the first period TA1 from the zero-crossing point (point in time t4) of the AC voltage Vac through the point in time t5, the switch 11 of the switch circuit 102 is electrically non-conductive and the sub-power supply circuit 322 may be supplied with power from the AC power supply 2 and perform the operation of generating voltage.

After that, at a timing (i.e., at a point in time t6 shown in FIG. 4) when an electrically conductive period T10 corresponding to the dimming level has passed since the point in time t5, the sub-control circuit 22 controls the switch 11 of the switch circuit 102 to the electrically non-conductive state. As a result, in the electrically conductive period T10 from the point in time t5 through the point in time t6, power is supplied from the AC power supply 2 to the load 3B via the switch 11 of the switch circuit 102, thus turning the load 3B ON at a predetermined dimming level.

Thereafter, when the absolute value of the voltage value of the AC voltage Vac becomes less than a predetermined reference voltage (at a point in time t7 shown in FIG. 4), the sub-power supply circuit 322 performs the operation of generating voltage. This allows, even in a second period TA2 from the point in time t7 through the zero-crossing point of the AC voltage Vac (i.e., the point in time t8 shown in FIG. 4), the sub-power supply circuit 322 to be supplied with power from the AC power supply 2. Thus, the sub-power supply circuit 322 may be supplied with power from the AC power supply 2 and may generate the power to be supplied to the sub-control circuit 22 and other circuits even in the second period TA2.

The load control system 1 may turn the load 3A OFF while turning the load 3B ON with its dimming level controlled by alternately and repeatedly performing the operation for a half cycle in which the AC voltage Vac has positive polarity and the operation for a half cycle in which the AC voltage Vac has negative polarity.

Note that the load control system 1 operates to turn the load 3A ON with the dimming level controlled while turning the load 3B OFF in the same way as in turning the load 3B ON with the dimming level controlled while turning the load 3A OFF. Thus, description of the load control system's 1 operation in the former case will be omitted herein.

(3.3) Operation to Turn Two Loads ON

Next, it will be described how the main control circuit 21 operates to turn both of the loads 3A, 3B ON in accordance with a control signal from the control master device 5 or an operating command entered through the interface unit 40.

Before starting the processing of turning the load 3 ON, the sub-control circuit 22 determines whether or not the loads 3A, 3B are connected. In the following description, it will be described how the sub-control circuit 22 operates when determining that the loads 3A, 3B should be both connected.

The main control circuit 21 outputs a control signal representing the dimming levels of the loads 3A, 3B to the sub-control circuit 22.

On receiving the control signal from the main control circuit 21, the sub-control circuit 22 controls the ON/OFF states of the respective switches 11 of the switch circuits 101, 102 at phase angles corresponding to the dimming levels of the loads 3A, 3B to turn the loads 3A, 3B ON with their dimming levels controlled.

To turn both of the loads 3A, 3B ON, the sub-control circuit 22 determines, based on the output voltage V31 of the main power supply circuit 31 and the output voltage V321 of the sub-power supply circuit 321, the timing to make the switch 11 of the switch circuit 101 electrically conductive in each half cycle of the AC voltage Vac. In addition, the sub-control circuit 22 also determines, based on the output voltage V322 of the sub-power supply circuit 322, the timing to make the switch 11 of the switch circuit 102 electrically conductive in each half cycle of the AC voltage Vac.

First, it will be described how the sub-control circuit 22 controls the ON/OFF states of the switch 11 of the switch circuit 101 in a half cycle in which the AC voltage Vac has positive polarity. Based on the result of detection of the zero-crossing point of the AC voltage Vac by the zero-crossing detection unit 231 in a half cycle in which the AC voltage Vac has positive polarity, the sub-control circuit 22 controls the switch 11 of the switch circuit 101 to the electrically conductive state at a timing when the first period TA1 has passed since the zero-crossing point.

Figure 5:
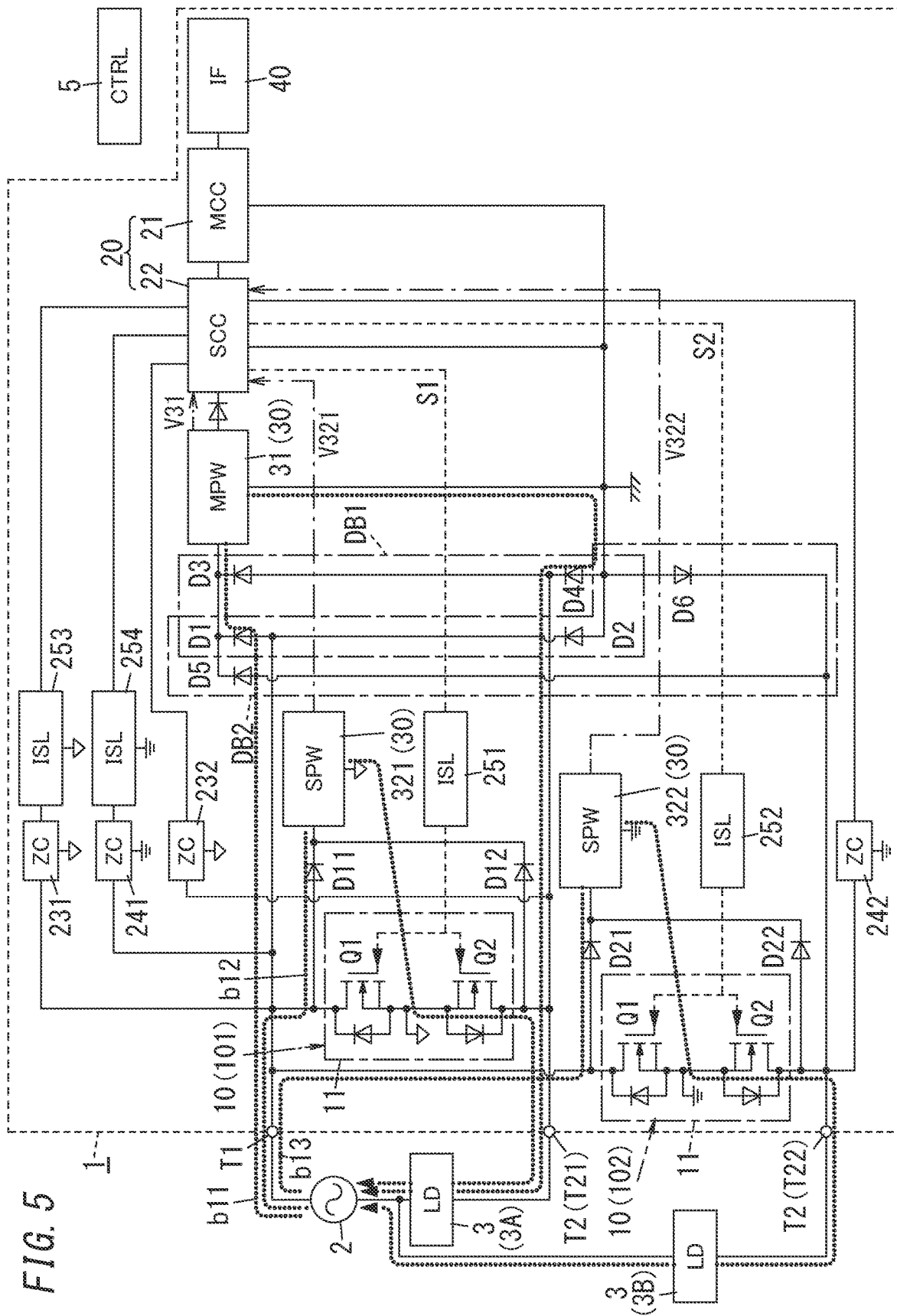

In the period from the zero-crossing point of the AC voltage Vac through a point in time when the switch 11 of the switch circuit 101 is controlled to the electrically conductive state, the main power supply circuit 31 and the sub-power supply circuit 321 are supplied with the AC voltage Vac generated across the switch circuit 101, and therefore, perform the operation of generating voltage. In FIG. 5, the dotted line b11 indicates a path along which a current flows from the AC power supply 2 to the main power supply circuit 31 and the dotted line b12 indicates a path along which a current flows from the AC power supply 2 to the sub-power supply circuit 321. In this case, the sub-control circuit 22 determines the time width of the first period TA1 based on the voltage value of the output voltage V31 of the main power supply circuit 31 and the voltage value of the output voltage V321 of the sub-power supply circuit 321. The sub-control circuit 22 is provided with information about the voltage value of the output voltage V31 by the main power supply circuit 31 and is also provided with information about the voltage value of the output voltage V321 by the sub-power supply circuit 321 via the insulating circuit. The sub-control circuit 22 controls the switch 11 of the switch circuit 101 to the electrically conductive state at a timing when the output voltage V31 of the main power supply circuit 31 and the output voltage V321 of the sub-power supply circuit 321 both exceed their lower limit voltages. This allows the sub-control circuit 22 to control the switch 11 of the switch circuit 101 to the electrically conductive state after the main power supply circuit 31 and the sub-power supply circuit 322 have generated the voltages required.

Thereafter, at a timing when the electrically conductive period T10 corresponding to the dimming level has passed since the switch 11 of the switch circuit 101 was turned electrically conductive, the sub-control circuit 22 controls the switch 11 of the switch circuit 101 to the electrically non-conductive state. This allows the load 3A to be supplied with power from the AC power supply 2 via the switch 11 of the switch circuit 101, thus turning the load 3A ON at a predetermined dimming level.

Next, it will be described how the sub-control circuit 22 controls the ON/OFF states of the switch 11 of the switch circuit 102 in a half cycle in which the AC voltage Vac has positive polarity. Based on the result of detection of the zero-crossing point of the AC voltage Vac by the zero-crossing detection unit 241 in a half cycle in which the AC voltage Vac has positive polarity, the sub-control circuit 22 controls the switch 11 of the switch circuit 102 to the electrically conductive state at a timing when the first period TA1 has passed since the zero-crossing point.

In the period from the zero-crossing point of the AC voltage Vac through a point in time when the switch 11 of the switch circuit 102 is controlled to the electrically conductive state, the sub-power supply circuit 322 is supplied with the AC voltage Vac generated across the switch circuit 102, and therefore, performs the operation of generating voltage. In FIG. 5, the dotted line b13 indicates a path along which a current flows from the AC power supply 2 to the sub-power supply circuit 322. In this case, the sub-control circuit 22 determines the time width of the first period TA1 based on the voltage value of the output voltage V322 of the sub-power supply circuit 322. The sub-control circuit 22 is provided with information about the voltage value of the output voltage V322 by the sub-power supply circuit 322 via the insulating circuit. The sub-control circuit 22 controls the switch 11 of the switch circuit 102 to the electrically conductive state at a timing when the output voltage of the sub-power supply circuit 322 exceeds the lower limit voltage of the sub-power supply circuit 322. This allows the sub-control circuit 22 to control the switch 11 of the switch circuit 102 to the electrically conductive state after the sub-power supply circuit 322 has generated the voltage required.

Thereafter, at a timing when the electrically conductive period T10 corresponding to the dimming level has passed since the switch 11 of the switch circuit 102 was turned electrically conductive, the sub-control circuit 22 controls the switch 11 of the switch circuit 102 to the electrically non-conductive state. This allows the load 3B to be supplied with power from the AC power supply 2 via the switch 11 of the switch circuit 102, thus turning the load 3B ON at a predetermined dimming level.

In a half cycle in which the AC voltage Vac has negative polarity, the load control system 1 performs control in the same way as in the half cycle in which the AC voltage Vac has positive polarity. The load control system 1 may turn the loads 3A, 3B ON with their dimming level controlled by alternately and repeatedly performing the operation for a half cycle in which the AC voltage Vac has positive polarity and the operation for a half cycle in which the AC voltage Vac has negative polarity.

Figure 6:
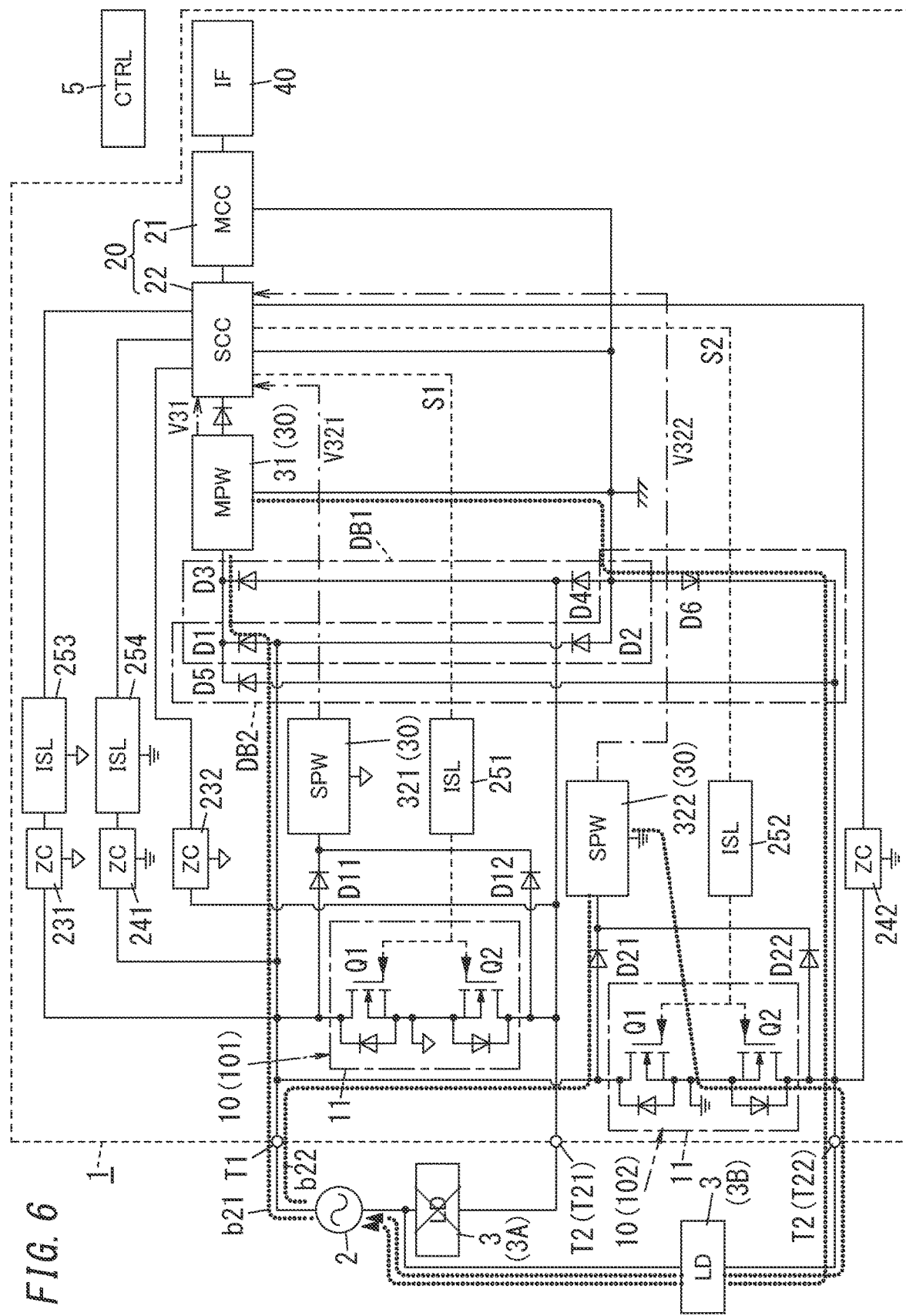
FIG. 6 illustrates how the load control system operates to turn the other load ON when one load is under no-load conditions.

(3.4) Operation to Turn One Load ON with the Other Load Under No-Load Conditions Next, it will be described with reference to FIG. 6 how to turn one of the loads 3A, 3B (e.g., the load 3B) ON when the other load 3A has turned into no-load conditions due to failure, for example.

Before starting the processing of turning the load 3 ON, the sub-control circuit 22 determines whether or not the loads 3A, 3B are connected. In the following description, it will be described how the sub-control circuit 22 operates when determining that the load 3A should have turned into no-load conditions.

If the load 3A has turned into no-load conditions, then the main power supply circuit 31 receives power based on the voltage generated across the switch circuit 102 associated with the load 3B. Thus, the sub-control circuit 22 determines, based on the output voltage V31 of the main power supply circuit 31 and the output voltage V322 of the sub-power supply circuit 322, the timing to make the switch 11 of the switch circuit 102 electrically conductive.

First, it will be described how the sub-control circuit 22 controls the ON/OFF states of the switch 11 of the switch circuit 102 in a half cycle in which the AC voltage Vac has positive polarity. Based on the result of detection of the zero-crossing point of the AC voltage Vac by the zero-crossing detection unit 241 in a half cycle in which the AC voltage Vac has positive polarity, the sub-control circuit 22 controls the switch 11 of the switch circuit 102 to the electrically conductive state at a timing when the first period TA1 has passed since the zero-crossing point.

In the period from the zero-crossing point of the AC voltage Vac through a point in time when the switch 11 of the switch circuit 102 is controlled to the electrically conductive state, the main power supply circuit 31 and the sub-power supply circuit 322 are supplied with the AC voltage Vac generated across the switch circuit 102, and therefore, perform the operation of generating voltage. In FIG. 6, the dotted line b21 indicates a path along which a current flows from the AC power supply 2 to the main power supply circuit 31 and the dotted line b22 indicates a path along which a current flows from the AC power supply 2 to the sub-power supply circuit 322. In this case, the sub-control circuit 22 determines the time width of the first period TA1 based on the voltage value of the output voltage V31 of the main power supply circuit 31 and the voltage value of the output voltage V322 of the sub-power supply circuit 322. The sub-control circuit 22 controls the switch 11 of the switch circuit 102 to the electrically conductive state at a timing when the output voltage V31 of the main power supply circuit 31 and the output voltage V322 of the sub-power supply circuit 322 both exceed their lower limit voltages. This allows the sub-control circuit 22 to control the switch 11 of the switch circuit 102 to the electrically conductive state after the main power supply circuit 31 and the sub-power supply circuit 322 have generated the voltages required.

Thereafter, at a timing when the electrically conductive period T10 corresponding to the dimming level has passed since the switch 11 of the switch circuit 102 was turned electrically conductive, the sub-control circuit 22 controls the switch 11 of the switch circuit 102 to the electrically non-conductive state. This allows the load 3B to be supplied with power from the AC power supply 2 via the switch 11 of the switch circuit 102, thus turning the load 3B ON at a predetermined dimming level.

In a half cycle in which the AC voltage Vac has negative polarity, the load control system 1 performs control in the same way as in the half cycle in which the AC voltage Vac has positive polarity. The load control system 1 may turn the loads 3A, 3B ON with their dimming levels controlled by alternately and repeatedly performing the operation for a half cycle in which the AC voltage Vac has positive polarity and the operation for a half cycle in which the AC voltage Vac has negative polarity.

As can be seen from the foregoing description, according to this embodiment, if any of the plurality of second terminals T2 has fallen into no-load conditions, the power supply circuit 30 receives power from the AC power supply 2 via the other ones of the plurality of second terminals T2 and the first terminal T1. Thus, even if any of the plurality of second terminals T2 has fallen into no-load conditions, the power supply circuit 30 may still receive power via the other second terminals T2, thus allowing the load control system 1 to continue to operate.

(4) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure.

Next, variations of the exemplary embodiment described above will be enumerated one after another. Optionally, the variations to be described below may be adopted in combination as appropriate.

The load control system 1 according to the present disclosure includes a computer system. In that case, the computer system may include, as principal hardware components, a processor and a memory. The functions of the load control system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (VLSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, in the embodiment described above, the plurality of functions of the load control system 1 are integrated together in a single housing (body 90). However, this is only an example and should not be construed as limiting. Alternatively, those constituent elements of the load control system 1 may be distributed in multiple different housings. Still alternatively, at least some functions of the load control system 1 may be implemented as a cloud computing system as well.

In the load control system 1 according to the embodiment described above, two loads 3 are provided. However, this is only an example of the present disclosure and should not be construed as limiting. Alternatively, three or more loads 3 may be controlled on an individual basis. That is to say, the number of the second terminals T2 provided and the number of the switch circuits 101 connected between the second terminals T2 and the first terminal T1 may be three or more such that three or more loads 3 are controllable on an individual basis. In that case, the power supply circuit 30 may be electrically connected to the three or more second terminals T2 and receive power via some or all of the three or more second terminals T2 to perform the voltage generating operation.

In the embodiment described above, the load control system 1 is applied to loads 3 each using LED elements as a light source. However, this is only an example of the present disclosure and should not be construed as limiting. Alternatively, the load control system 1 is also applicable to light sources including capacitor-input type circuits, having high impedance, and turning ON with a small amount of current. Examples of light sources of this type include organic electroluminescent (EL) elements. In addition, the load control system 1 is also applicable to various types of light sources, such as a discharge lamp, as loads 3.

Furthermore, the load 3 to be controlled by the load control system 1 does not have to be a lighting load but may also be a heater or a fan, for example. If the load 3 is a heater, then the load control system 1 controls the quantity of heat generated by the heater by adjusting the average power to be supplied to the heater. Meanwhile, if the load 3 is a fan, the load control system 1 constitutes a regulator for adjusting the rotational velocity of the fan.

Furthermore, the switch 11 does not have to be made up of switching elements Q1, Q2 implemented as MOSFETs. Alternatively, the switch 11 may also be made up of two insulated gate bipolar transistors (IGBTs) which are connected in anti-series. Furthermore, the rectifier elements (diodes) that realize the unidirectionally ON state of the switch 11 do not have to be parasitic diodes for the switching elements Q1, Q2 but may be external diodes as well. The diodes may be built in the same package as the switching elements Q1, Q2. Optionally, the switch 11 may also be a semiconductor element with a double-gate (dual-gate) structure that uses a wide-bandgap semiconductor material such as GaN (gallium nitride). This configuration contributes to reducing the conduction loss involved with the switch 11.

Optionally, the switch 11 may also be controlled to a "forward ON state" instead of the "bidirectionally ON state." Conversely, the switch 11 may be controlled to the "bidirectionally ON state" instead of the "forward ON state." Furthermore, the switch 11 may also be controlled to a "backward ON state" instead of the "bidirectionally OFF state" Alternatively, the switch 11 may also be controlled to the "bidirectionally OFF state" instead of the "backward ON state." That is to say, the switch 11 may be controlled in any of various manners as long as the electrically conductive state or electrically non-conductive state thereof remains the same.

Furthermore, in the embodiment described above, the switch 11 is controlled by the reverse phase control method. Alternatively, the switch 11 may also be controlled by the forward phase control method in which power starts to be supplied to the loads 3A, 3B in the middle of a period corresponding to a half cycle of the AC voltage Vac and the supply of power to the loads 3A, 3B is cut off at the zero-crossing point of the next half cycle of the AC voltage Vac. Still alternatively, the switch 11 may also be controlled by a universal control method compatible with both the forward phase control method and the reverse phase control method.

Furthermore, in the foregoing description, if one of two values such as voltage values being compared with each other is "equal to or greater than" the other, this phrase may herein cover both a situation where these two values are equal to each other and a situation where one of the two values is greater than the other. However, this should not be construed as limiting. Alternatively, the phrase "equal to or greater than" may also be a synonym of the phrase "greater than" that covers only a situation where one of the two values is over the other. That is to say, it is arbitrarily changeable, depending on selection of the threshold value or any preset value, whether or not the phrase "equal to or greater than" covers the situation where the two values are equal to each other. Therefore, from a technical point of view, there is no difference between the phrase "equal to or greater than" and the phrase "greater than." Similarly, the phrase "less than" may be a synonym of the phrase "equal to or less than" as well.

(4.1) First Variation

Figure 7:
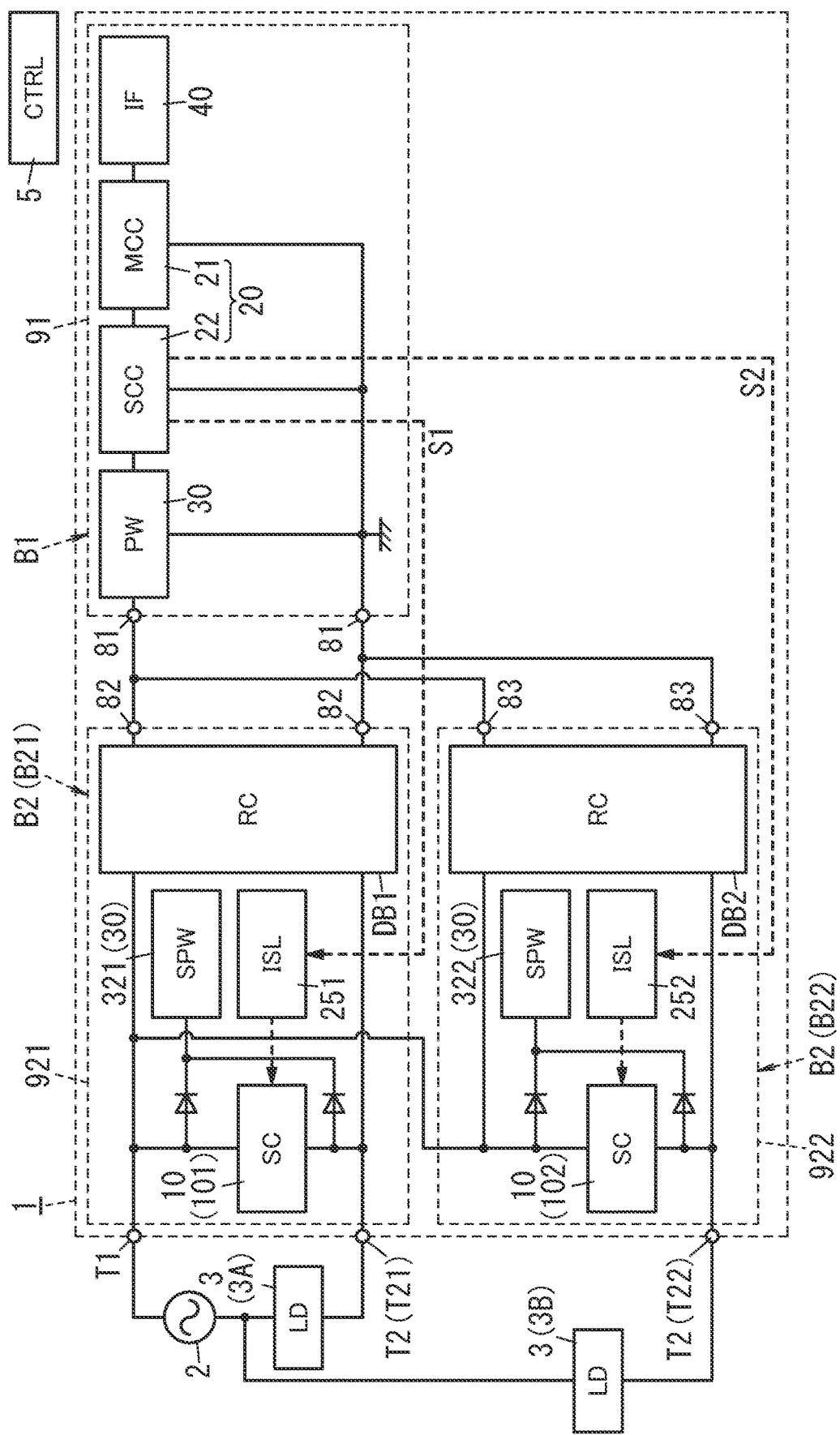
FIG. 7 is a schematic circuit diagram of a load control system according to a first variation of the exemplary embodiment of the present disclosure.

A load control system 1 according to a first variation further includes a first circuit block B1 and a plurality of (e.g., two) second circuit blocks B2 (B21, B22) as shown in FIG. 7, which is a major difference from the exemplary embodiment described above. In the following description, any constituent element of the first variation, having the same function as a counterpart of the exemplary embodiment described above, will be designated by the same reference numeral as that counterpart's, and description thereof will be omitted herein as appropriate.

Each of the plurality of (e.g., two) second circuit blocks B2 includes at least one second connection node. Specifically, the second circuit block B21 includes a pair of second connection nodes 82 and the second circuit block B22 includes a pair of second connection nodes 83. The pair of second connection nodes 82 that the second circuit block B21 includes are electrically connected to a pair of first connection nodes 81 that the first circuit block B1 includes. The pair of second connection nodes 82 that the second circuit block B21 includes are electrically connected to the pair of second connection nodes 83 that the second circuit block B22 includes. The pair of second connection nodes 83 that the second circuit block B22 includes are electrically connected to the pair of first connection nodes 81 that the first circuit block B1 includes. The pair of second connection nodes 83 that the second circuit block B22 includes are electrically connected to the pair of second connection nodes 82 that the second circuit block B21 includes. Each of the second circuit blocks B21, B22 is electrically connected to the first circuit block B1 via its associated pair of second connection nodes 82, 83 by connecting the associated pair of second connection nodes 82, 83 to the first connection nodes 81. In this variation, the pair of first connection nodes 81 and the two pairs of second connection nodes 82, 83 may be implemented as any appropriate electrically conductive connection members such as connectors, jumper lines, or electric wires.

The first circuit block B1 includes a first housing 91 for housing circuits including at least a part of the control circuit 20 (such as the main control circuit 21) and at least a part of the power supply circuit 30 (such as the main power supply circuit 31). Note that in the circuit diagrams shown in FIG. 7 and other drawings, the power supply circuit is abbreviated as "PW" and the rectifier circuits are abbreviated as "RC" for the sake of simplicity.

Also, the second circuit blocks B21, B22 are associated one to one with the plurality of switch circuits 101, 102. Each of the second circuit blocks B21, B22 includes a second housing 921, 922 for housing an associated one switch circuit 10 out of the switch circuits 101, 102. Specifically, the second circuit block B21 includes a second housing 921 for housing the switch circuit 101. The second circuit block B22 includes a second housing 922 for housing the switch circuit 102. In this variation, each of the second housings 921, 922 is attachable to, and removable from, the first housing 91. Note that in the circuit diagrams shown in FIG. 7 and other drawings, the switch circuits are abbreviated as "SC" for the sake of simplicity.

In this variation, the body 90 of the load control system 1 includes the first housing 91 and the second housings 921, 922. Attaching the second housings 921, 922 to the first housing 91 causes the second connection nodes 82, 83 to be electrically connected to the first connection node 81. The second housings 921, 922 are attachable to, and removable from, the first housing 91. The load control system 1 is provided by attaching the second circuit blocks B21, B22 to the first circuit block B1 implemented as a module.

(4.2) Second Variation

Figure 8:
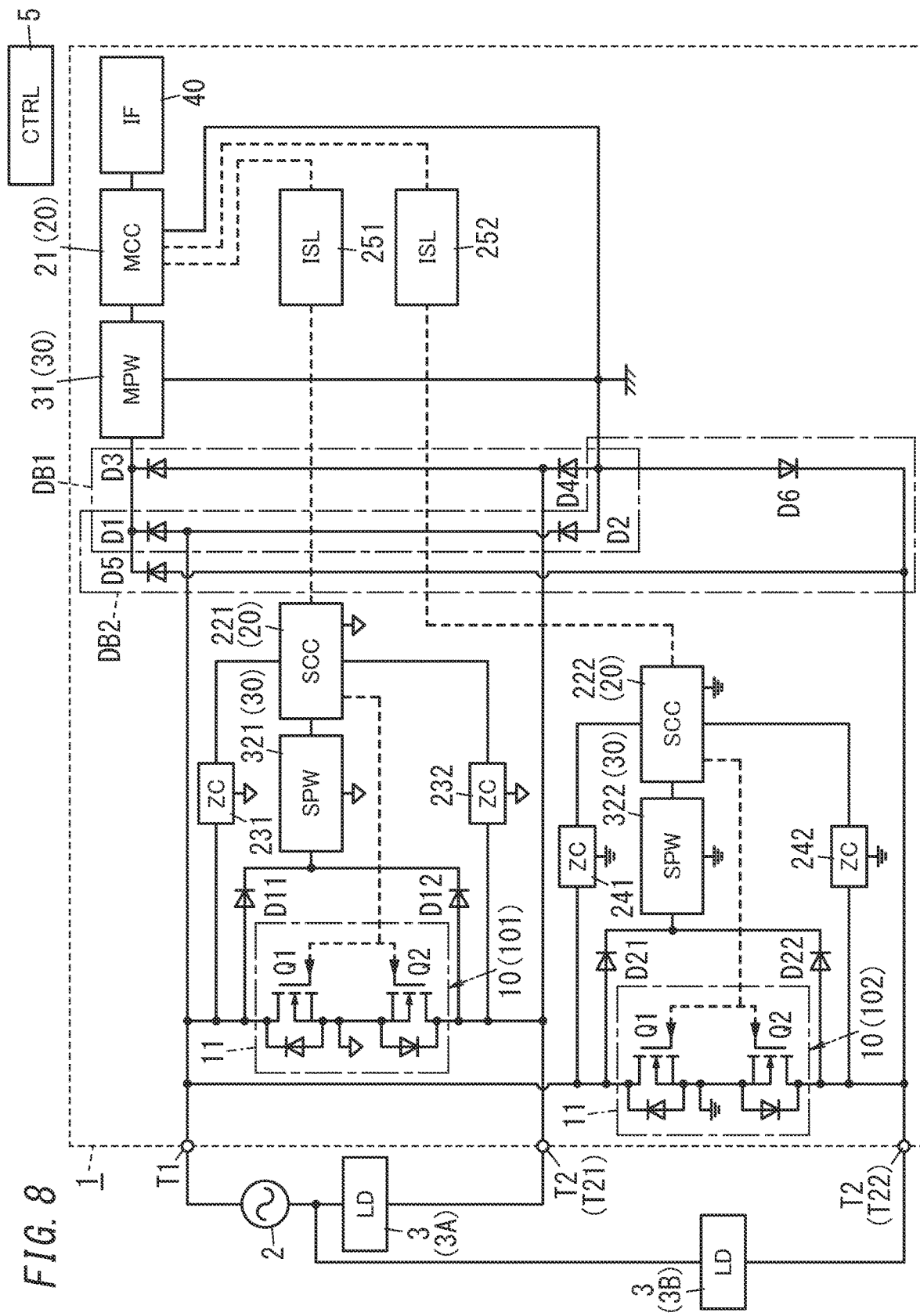
FIG. 8 is a schematic circuit diagram of a load control system according to a second variation of the exemplary embodiment of the present disclosure.

A load control system 1 according to a second variation includes a plurality of sub-control circuits 221, 222 provided for the plurality of switch circuits 101, 102, respectively, as shown in FIG. 8, which is a major difference from the exemplary embodiment described above. In the following description, any constituent element of the second variation, having the same function as a counterpart of the exemplary embodiment described above, will be designated by the same reference numeral as that counterpart's, and description thereof will be omitted herein as appropriate.

The sub-control circuit 221 controls the switch 11 of the switch circuit 101 to either the electrically conductive state or the electrically non-conductive state in accordance with a control signal supplied from the main control circuit 21 via the insulating circuit 251 and results of detection by the zero-crossing detection units 231, 232.

The sub-control circuit 222 controls the switch 11 of the switch circuit 102 to either the electrically conductive state or the electrically non-conductive state in accordance with the control signal supplied from the main control circuit 21 via the insulating circuit 252 and results of detection by the zero-crossing detection units 241, 242.

The load control system 1 operates in the same way as its counterpart according to the embodiment described above, and description thereof will be omitted herein.

In this second variation, the control circuit 20 includes the main control circuit 21 and the plurality of sub-control circuits 221, 222. The plurality of sub-control circuits 221, 222 are associated one to one with the plurality of switch circuits 101, 102. The main control circuit 21 controls the plurality of sub-control circuits 221, 222. Each of the plurality of sub-control circuits 221, 222 controls the switch 11 of its associated switch circuit 10 out of the plurality of switch circuits 101, 102. Thus, according to the second variation, the main control circuit 21 is used in common by the plurality of switch circuits 10. That is to say, the main control circuit 21 that forms part of the control circuit 20 is a common circuit to be used in common by the plurality of switch circuits 10. Having the main control circuit 21 used in common by the plurality of switch circuits 10 allows the overall circuit scale of the load control system 1 to be reduced.

In addition, according to the second variation, the power supply circuit 30 includes the main power supply circuit 31 and the plurality of sub-power supply circuits 321, 322. The plurality of sub-power supply circuits 321, 322 are associated one to one with the plurality of sub-control circuits 221, 222. The main power supply circuit 31 supplies power to the main control circuit 21. Each of the plurality of sub-power supply circuits 321, 322 supplies power to its associated sub-control circuit 221, 222 out of the plurality of sub-control circuits 221, 222. Thus, according to this second variation, the main power supply circuit 31 is used in common by the plurality of switch circuits 10. That is to say, the main power supply circuit 31 that forms part of the power supply circuit 30 supplies power to the main control circuit 21 to be used in common by the plurality of switch circuits 10, and therefore, is also used in common by the plurality of switch circuits 10. According to the second variation, the main power supply circuit 31 is used in common by the plurality of switch circuits 10, thus further reducing the overall circuit scale of the load control system 1.

(4.3) Third Variation

Figure 9:
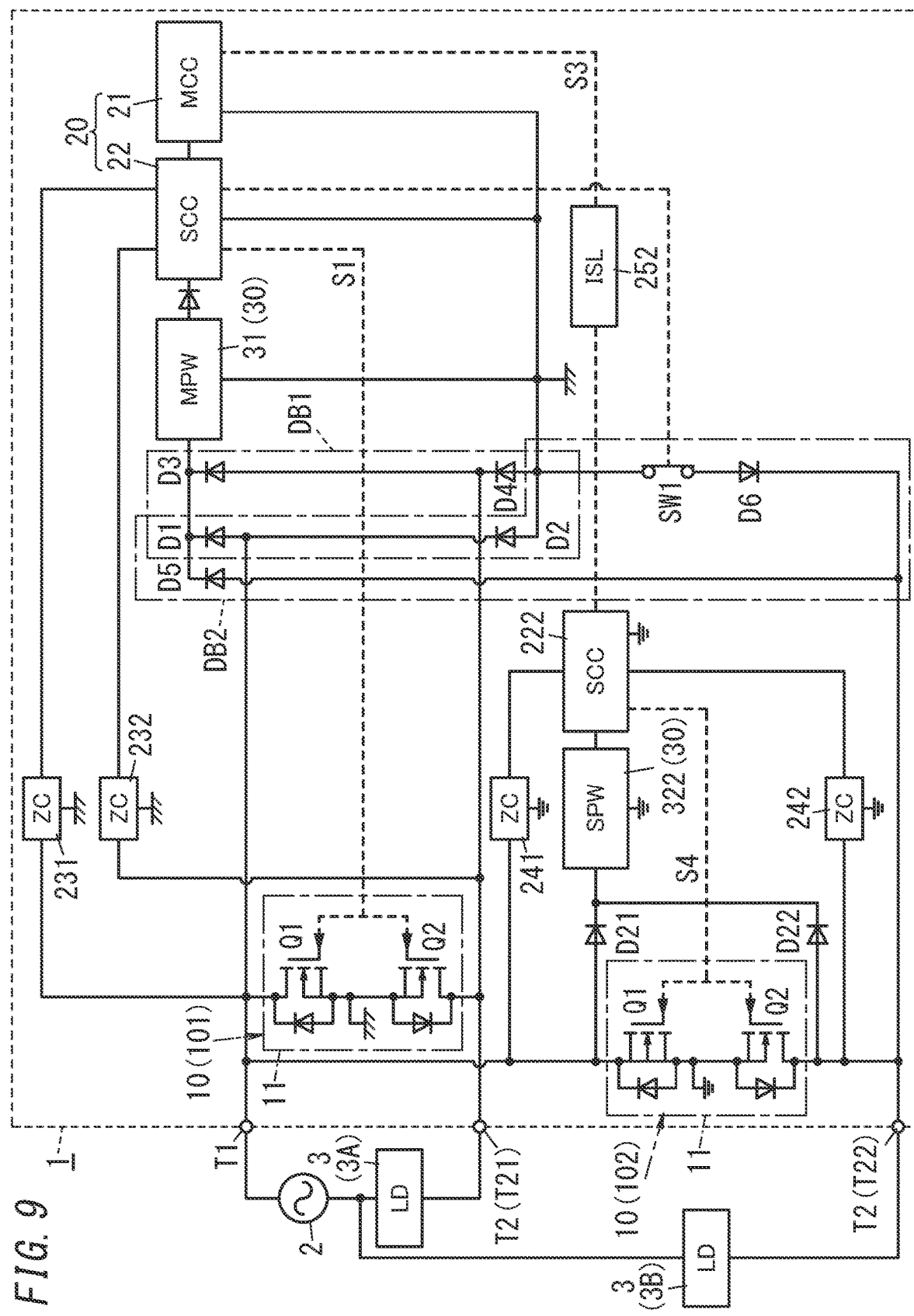
FIG. 9 is a schematic circuit diagram of a load control system according to a third variation of the exemplary embodiment of the present disclosure.
Figure 10:
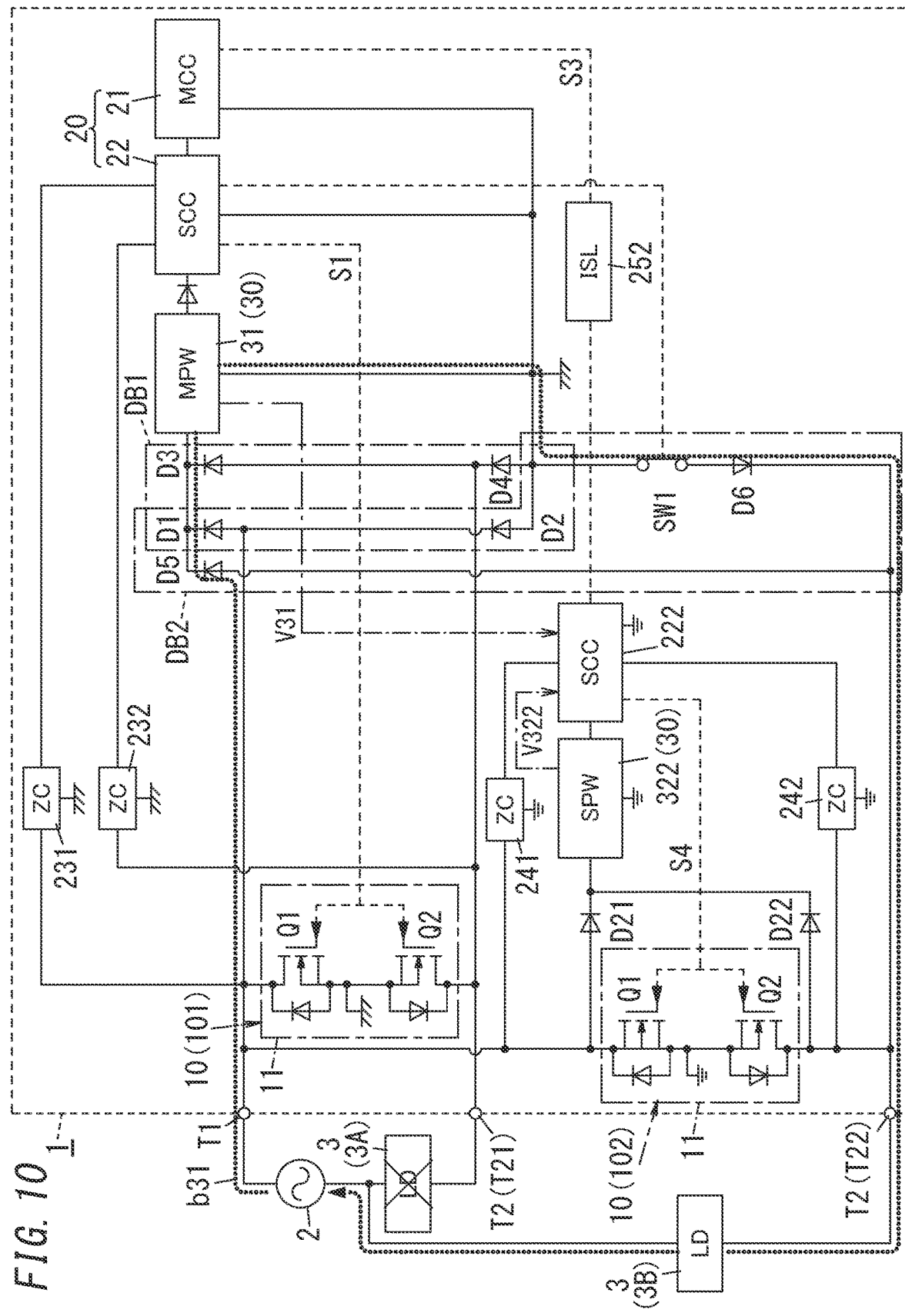
FIG. 10 illustrates how the load control system according to the third variation operates.

In a load control system 1 according to a third variation, the sub-control circuit 22 is not electrically insulated from the switch circuit 101 as shown in FIGS. 9 and 10, which is a major difference from the exemplary embodiment described above. In the following description, any constituent element of the third variation, having the same function as a counterpart of the exemplary embodiment described above, will be designated by the same reference numeral as that counterpart's, and description thereof will be omitted herein as appropriate. Note that in FIGS. 9 and 10, illustration of the interface unit 40 and the control master device 5 is omitted.

In the third variation, the ground of the switch circuit 101, out of the plurality of switch circuits 101, 102, is used in common as the ground of the main power supply circuit 31, thereby eliminating the insulating circuit that electrically insulates the switch circuit 101 from the sub-control circuit 22. In addition, the ground of the switch circuit 101 is used in common as the ground of the main power supply circuit 31, thereby eliminating the insulating circuit that electrically insulates the zero-crossing detection units 231, 232 from the sub-control circuit 22. The sub-control circuit 22 outputs a control signal S1 to the switch circuit 101 in accordance with a control signal supplied from the main control circuit 21 and the detection signals supplied from the zero-crossing detection units 231, 232, thereby controlling the switch 11 of the switch circuit 101 to either the electrically conductive state or the electrically non-conductive state.

In addition, in the third variation, a switch (on-off switch) SW1 is provided between the ground of the main power supply circuit 31 and the diode D6, thereby making the sub-control circuit 22 control the ON/OFF states of the switch SW1. The switch SW1 is a normally ON contact and turns ON when no control signal is supplied from the sub-control circuit 22.

To turn the load 3A ON and the load 3B OFF with both of these loads 3A, 3B connected, the sub-control circuit 22 turns the switch SW1 OFF. In this case, the main power supply circuit 31 receives power from the AC power supply 2 via the first terminal T1 and the second terminal T21 and generates power to be supplied to the main control circuit 21, the sub-control circuit 22, and other circuits. When the switch SW1 turns OFF, the electrical path between the main power supply circuit 31 and the second terminal T22 is interrupted, thus reducing the chances of disturbance such as noise entering the main power supply circuit 31 from the second terminal T22.

Also, when determining that the load 3A should not be connected but only the load 3B should be connected, the sub-control circuit 22 turns the switch SW1 ON. In that case, the main power supply circuit 31 may receive power from the AC power supply 2 via the first terminal T1 and the second terminal T22 and generate power to be supplied to the main control circuit 21, the sub-control circuit 22, and other circuits.

In addition, according to this third variation, the sub-control circuit 222 for controlling the switch 11 of the switch circuit 102 is provided and operates by receiving power from the sub-power supply circuit 322. The sub-control circuit 222 outputs, in accordance with the control signal S3 supplied from the main control circuit 21 via the insulating circuit 252 and the detection signals supplied from the zero-crossing detection units 241, 242, a control signal S4 to the switch circuit 102 to control the switch 11 of the switch circuit 102 to either the electrically conductive state or the electrically non-conductive state.

Next, it will be described how the load control system 1 according to the third variation operates.

(a) Operation to Turn Both Loads OFF

First, it will be described how the load control system 1 operates to turn both of the loads 3A, 3B OFF in accordance with a control signal from the control master device 5 or an operating command entered through the interface unit 40.

Before starting the processing of turning the loads 3 OFF, the main control circuit 21 and the sub-control circuit 22 determine whether or not the loads 3 are connected. For example, on receiving a detection signal from the zero-crossing detection unit 232, the sub-control circuit 22 determines that the load 3A should be connected between the first terminal T1 and the second terminal T21 and outputs the decision to the main control circuit 21. Also, when finding that main control circuit 21 may communicate with the sub-control circuit 222 via the insulating circuit 252, the main control circuit 21 determines that the load 3B should be connected between the first terminal T1 and the second terminal T22. In this case, the insulating circuit 252 may transmit a signal bidirectionally between the main control circuit 21 and the sub-control circuit 222. The main control circuit 21 outputs a dead or alive signal to the sub-control circuit 222 via the insulating circuit 252. When receiving a signal in response to the dead or alive signal from the sub-control circuit 222 via the insulating circuit 252, the main control circuit 21 determines that the load 3B should be connected. If the loads 3A, 3B are both connected, the main control circuit 21 turns the switch SW1 ON.

When the main control circuit 21 outputs a control signal to turn both of the loads 3A, 3B OFF to the sub-control circuits 22, 222, the sub-control circuits 22, 222 output control signals S1, S4 that make the switch 11 electrically non-conductive to the switch circuits 101, 102, respectively.

In accordance with the control signal S1 supplied from the sub-control circuit 22, the switch circuit 101 keeps the switch 11 electrically non-conductive and turns the load 3A OFF. In addition, in accordance with the control signal S4 supplied from the sub-control circuit 222, the switch circuit 102 keeps the switch 11 electrically non-conductive and turns the load 3B OFF.

In this case, if the switch 11 of the switch circuit 101 is electrically non-conductive, the AC voltage Vac of the AC power supply 2 is applied across the switch 11 of the switch circuit 101. This allows the main power supply circuit 31 to receive power from the AC power supply 2 via the first terminal T1 and the second terminal T21 and generate power to be supplied to the main control circuit 21 and the sub-control circuit 22.

(b) Operation to Turn Only Load 3A ON

Next, it will be described how the main control circuit 21 turns the load 3A ON and the load 3B OFF in accordance with a control signal from the control master device 5 or an operating command entered through the interface unit 40.

Before starting the processing of turning any of the loads 3 ON, the main control circuit 21 and sub-control circuit 22 determine whether or not the loads 3 are connected. To turn the load 3A ON and the load 3B OFF with the loads 3A, 3B both connected, the main control circuit 21 turns the switch SW1 OFF.

When the switch SW1 turns OFF, the main power supply circuit 31 receives power from the AC power supply 2 via the first terminal T1 and the second terminal T21 and generates power to be supplied to the main control circuit 21, the sub-control circuit 22, and other circuits.

In this case, the sub-control circuit 22 controls the switch 11 of the switch circuit 101 in accordance with a control signal supplied from the main control circuit 21 and detection signals supplied from the zero-crossing detection units 231, 232, thus turning the load 3A ON with its brightness controlled according to the dimming level represented by the control signal.

In this case, the switch 11 of the switch circuit 102 is controlled to the electrically non-conductive state, and therefore, the AC voltage Vac of the AC power supply 2 is applied across the switch circuit 102. This allows the sub-power supply circuit 322 to receive power from the AC power supply 2 via the first terminal T1 and the second terminal T22 and generate power to be supplied to the sub-control circuit 222.

(c) Operation to Turn Only Load 3B ON

Next, it will be described how the main control circuit 21 turns the load 3A OFF and the load 3B ON in accordance with a control signal from the control master device 5 or an operating command entered through the interface unit 40.

Before starting the processing of turning any of the loads 3 ON, the main control circuit 21 and sub-control circuit 22 determine whether or not the loads 3 are connected. To turn the load 3A OFF and the load 3B ON with the loads 3A, 3B both connected, the main control circuit 21 turns the switch SW1 OFF. Alternatively, the main control circuit 21 may turn the switch SW1 ON.

The main control circuit 21 outputs a control signal as a dimming level control signal with the OFF level to the sub-control circuit 22. In response, the sub-control circuit 22 outputs a control signal S1 that makes the switch 11 electrically non-conductive to the switch circuit 101. At this time, the switch circuit 101 controls the switch 11 to the electrically non-conductive state in accordance with the control signal S1 supplied from the sub-control circuit 22. If the switch 11 of the switch circuit 101 is electrically non-conductive, then the AC voltage Vac of the AC power supply 2 is applied across the switch circuit 101. This allows the main power supply circuit 31 to receive power from the AC power supply 2 via the first terminal T1 and the second terminal T21 and generate power to be supplied to the main control circuit 21 and the sub-control circuit 222.

In addition, the main control circuit 21 also outputs a control signal S3 to the sub-control circuit 222. The control signal S3 supplied from the main control circuit 21 is provided to the sub-control circuit 222 via the insulating circuit 252. The sub-control circuit 222 outputs a control signal S4 to control the switch 11 of the switch circuit 102 to the switch circuit 102 in accordance with the control signal S3 supplied from the main control circuit 21 and the detection signals supplied from the zero-crossing detection units 241, 242. The switch circuit 102 controls the switch 11 to the electrically conductive state at a phase angle falling within a range corresponding to the dimming level in accordance with the control signal S4 supplied from the sub-control circuit 222, thus turning the load 3B ON with its brightness controlled according to the dimming level represented by the control signal.

(d) Operation when Only Load 3A is Connected

Next, it will be described how the load control system 1 operates when the load 3A is electrically connected between the first terminal T1 and the second terminal T21 and the load 3B is not electrically connected between the first terminal T1 and the second terminal T22.

Before starting the processing of turning any of the loads 3 ON, the main control circuit 21 and sub-control circuit 22 determine whether or not the loads 3 are connected. On finding the load 3B not connected, the main control circuit 21 turns the switch SW1 OFF.

When the switch SW1 turns OFF, the electrical path between the main power supply circuit 31 and the second terminal T22 is electrically interrupted. In that case, the main power supply circuit 31 receives power from the AC power supply 2 via the first terminal T1 and the second terminal T21 and generates power to be supplied to the main control circuit 21, the sub-control circuit 22, and other circuits.

The sub-control circuit 22 controls the switch 11 of the switch circuit 101 in accordance with a control signal supplied from the main control circuit 21 and detection signals supplied from the zero-crossing detection units 231, 232, thus turning the load 3A ON with its brightness controlled according to the dimming level represented by the control signal.

(e) Operation when Only Load 3B is Connected

Next, it will be described with reference to FIG. 10 how the load control system 1 operates when the load 3B is electrically connected between the first terminal T1 and the second terminal T22 and the electrical path between the first terminal T1 and the second terminal T21 has fallen into no-load conditions due to a failure of the load 3A or non-connection.

The switch SW1 is a normally ON contact. Thus, when the main power supply circuit 31 cannot receive power via the first terminal T1 and the second terminal T21, the switch SW1 turns ON. This causes the ground of the main power supply circuit 31 to be connected to the second terminal T22 via the switch SW1, thus allowing the main power supply circuit 31 to receive power from the AC power supply 2 via the first terminal T1 and the second terminal T22 and supply the power to the main control circuit 21 and the sub-control circuit 22. Before starting the processing of turning any of the loads 3 ON, the main control circuit 21 and sub-control circuit 22 determine whether or not the loads 3 are connected. On finding the load 3A not connected, the main control circuit 21 and the sub-control circuit 22 turn the switch SW1 ON. This keeps the switch SW1 ON and allows the main power supply circuit 31 to receive power from the AC power supply 2 via the first terminal T1 and the second terminal T22 and supply the power to the main control circuit 21, the sub-control circuit 22, and other circuits.

In this case, the sub-control circuit 222 controls the switch 11 of the switch circuit 102 in accordance with a control signal S3 supplied from the main control circuit 21 and detection signals supplied from the zero-crossing detection units 241, 242. This operation will be described in detail below.

It will be described how the sub-control circuit 222 performs the operation of controlling the ON/OFF states of the switch 11 of the switch circuit 102 in a half cycle in which the AC voltage Vac has positive polarity. Based on the result of detection of a zero-crossing point of the AC voltage Vac by the zero-crossing detection unit 241 in a half cycle in which the AC voltage Vac has positive polarity, the sub-control circuit 222 controls the switch 11 of the switch circuit 102 to the electrically conductive state at a timing when the first period TA1 has passed since the zero-crossing point.

In the period from the zero-crossing point of the AC voltage Vac through a point in time when the switch 11 of the switch circuit 102 is controlled to the electrically conductive state, the main power supply circuit 31 and the sub-power supply circuit 322 are supplied with the AC voltage Vac generated across the switch circuit 102, and therefore, perform the operation of generating voltage. In FIG. 10, the dotted line b31 indicates a path along which a current flows from the AC power supply 2 to the main power supply circuit 31. In this case, the sub-control circuit 222 determines the time width of the first period TA1 based on the voltage value of the output voltage V31 of the main power supply circuit 31 and the voltage value of the output voltage V322 of the sub-power supply circuit 322. The sub-control circuit 222 is provided with information about the voltage value of the output voltage V31 by the main power supply circuit 31 and also is provided with information about the voltage value of the output voltage V322 by the sub-power supply circuit 322 via the insulating circuit. The sub-control circuit 222 controls the switch 11 of the switch circuit 102 to the electrically conductive state at a timing when the output voltage V31 of the main power supply circuit 31 and the output voltage V322 of the sub-power supply circuit 322 both exceed their lower limit voltages. This allows the sub-control circuit 222 to control the switch 11 of the switch circuit 102 to the electrically conductive state after the main power supply circuit 31 and the sub-power supply circuit 322 have generated the voltages required.

Thereafter, at a timing when the electrically conductive period T10 corresponding to the dimming level has passed since the switch 11 of the switch circuit 102 was turned electrically conductive, the sub-control circuit 222 controls the switch 11 of the switch circuit 102 to the electrically non-conductive state. This allows the load 3B to be supplied with power from the AC power supply 2 via the switch 11 of the switch circuit 102, thus turning the load 3B ON at a predetermined dimming level.

In a half cycle in which the AC voltage Vac has negative polarity, the load control system 1 performs control in the same way as in the half cycle in which the AC voltage Vac has positive polarity. The load control system 1 may turn the loads 3A, 3B ON with their dimming level controlled by alternately and repeatedly performing the operation for a half cycle in which the AC voltage Vac has positive polarity and the operation for a half cycle in which the AC voltage Vac has negative polarity.

As described above, the load control system 1 according to the third variation further includes the switch (on-off switch) SW1 connected between one second terminal T2 out of the plurality of second terminals T2 and the power supply circuit 30. The control circuit 20 (in this variation, the sub-control circuit 22) turns the switch SW1 OFF when the second terminal T2, to which the switch SW1 is connected, out of the plurality of second terminals T2 is under no-load conditions. The control circuit's 20 turning the switch SW1 OFF when the second terminal T21, to which the switch SW1 is connected, is under no-load conditions reduces the chances of noise entering the power supply circuit 30 from the second terminal T21 under no-load conditions. Note that the switch SW1 may be an electromagnetic relay or a semiconductor switch, whichever is appropriate.

(4.4) Fourth Variation

Figure 11:
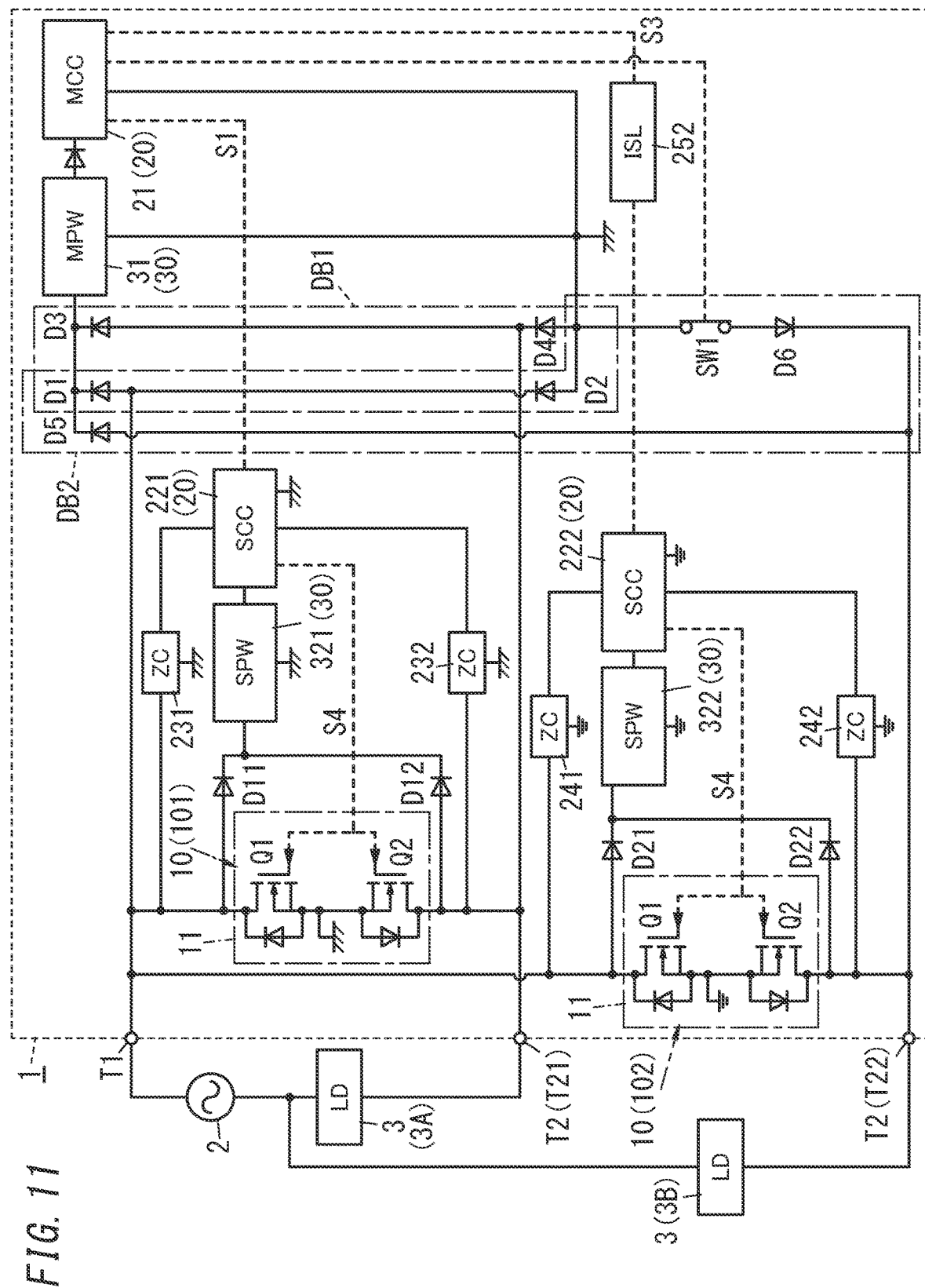
FIG. 11 is a schematic circuit diagram of a load control system according to a fourth variation of the exemplary embodiment of the present disclosure.

A load control system 1 according to a fourth variation includes a sub-power supply circuit 321 for receiving power from between both terminals of the switch circuit 101 and a sub-control circuit 221 supplied with power by the sub-power supply circuit 321 to control the switch 11 of the switch circuit 101 as shown in FIG. 11, which is a major difference from the third variation described above. In the following description, any constituent element of the fourth variation, having the same function as a counterpart of the exemplary embodiment described above, will be designated by the same reference numeral as that counterpart's, and description thereof will be omitted herein as appropriate. Note that in FIG. 11, illustration of the interface unit 40 and the control master device 5 is omitted.

In the fourth variation, the sub-control circuits 221, 222 are provided for the switch circuits 101, 102, respectively. The sub-control circuit 222 has the same function and operates in the same way as its counterpart of the third variation, and description thereof will be omitted herein.

The sub-control circuit 221 controls the switch 11 of the switch circuit 101 in accordance with a control signal supplied from the main control circuit 21 and detection signals supplied from the zero-crossing detection units 231, 232, thereby turning the loads 3 ON with their dimming levels controlled.

Note that the load control system 1 operates in the same way as the third variation, and description thereof will be omitted herein.

(4.5) Fifth Variation

Figure 12:
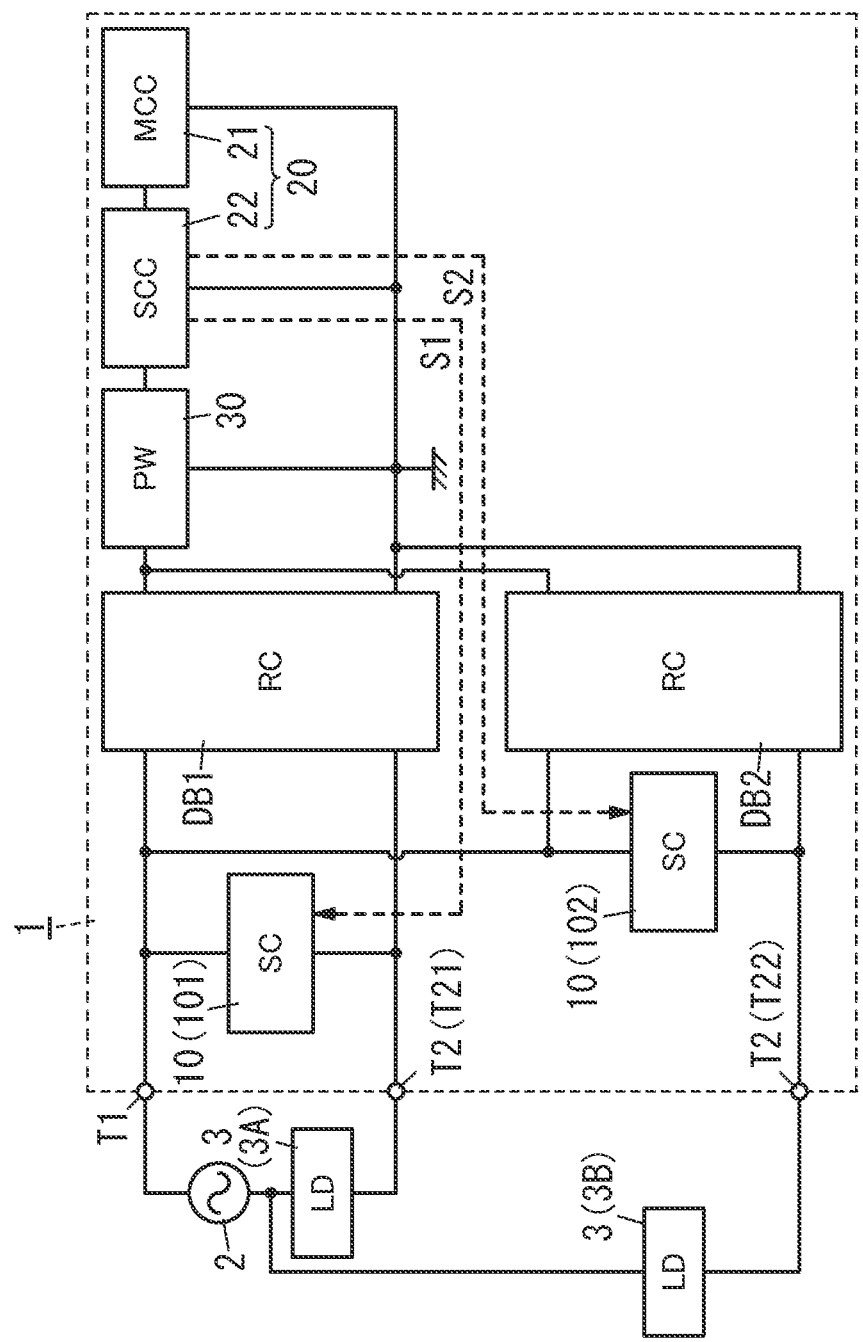
FIG. 12 is a schematic circuit diagram of a load control system according to a fifth variation of the exemplary embodiment of the present disclosure.

In a load control system 1 according to a fifth variation, the sub-control circuit 22 is not electrically insulated from the switch circuit 101, 102 as shown in FIG. 12, which is a major difference from the exemplary embodiment described above. In the following description, any constituent element of the fifth variation, having the same function as a counterpart of the exemplary embodiment described above, will be designated by the same reference numeral as that counterpart's, and description thereof will be omitted herein as appropriate.

In this fifth variation, the ground of the power supply circuit 30, the ground of the switch circuit 101, and the ground of the switch circuit 102 are common, and therefore, there is no need to electrically insulate the sub-control circuit 22 from the switch circuits 101, 102. Thus, in the fifth variation, the plurality of switch circuits 10 are not electrically insulated from the control circuit 20 or the power supply circuit 30, and therefore, an insulating circuit for electrically insulating the sub-control circuit 22 from the switch circuits 101, 102 may be eliminated. In other words, in this fifth variation, the plurality of switch circuits 10 are electrically connected to the control circuit 20 and the power supply circuit 30.

Note that the load control system 1 operates in the same way as the exemplary embodiment, and description thereof will be omitted herein.

(4.6) Sixth Variation

Figure 13:
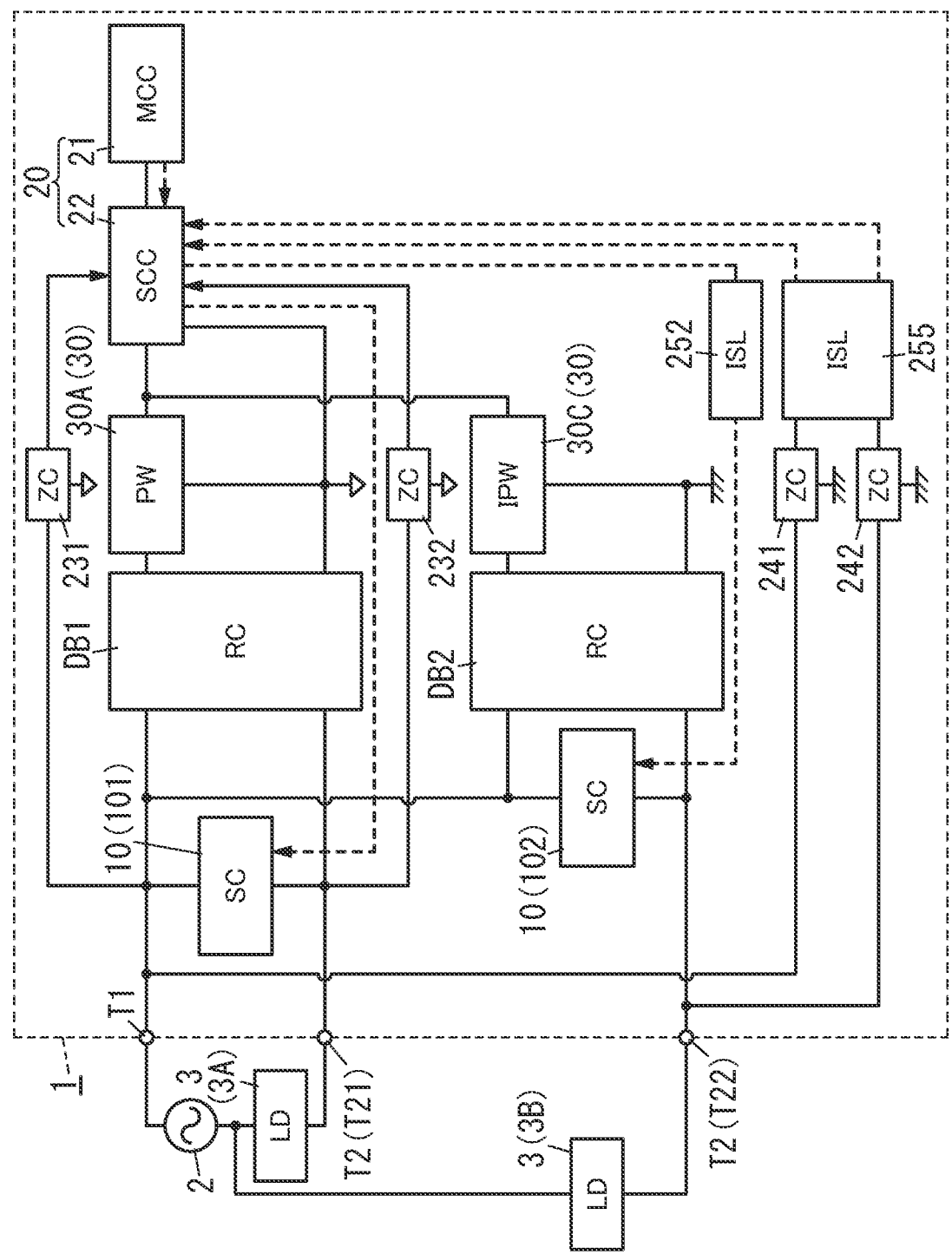
FIG. 13 is a schematic circuit diagram of a load control system according to a sixth variation of the exemplary embodiment of the present disclosure.

In a load control system 1 according to a sixth variation, the power supply circuit 30 includes a power supply circuit 30A and an insulating power supply circuit 30C provided for the switch circuits 101, 102, respectively, as shown in FIG. 13, which is a major difference from the exemplary embodiment described above. In the following description, any constituent element of the sixth variation, having the same function as a counterpart of the exemplary embodiment described above, will be designated by the same reference numeral as that counterpart's, and description thereof will be omitted herein as appropriate. Note that in FIG. 13, illustration of the interface unit 40 and the control master device 5 is omitted. In addition, in the circuit diagram shown in FIG. 13 and other drawings, the insulating power supply circuit is abbreviated as "IPW" for the sake of simplicity.

A rectifier circuit DB1 is connected between the first terminal T1 and the second terminal T21. The rectifier circuit DB1 rectifies the AC voltage Vac supplied via the first terminal T1 and the second terminal T21. The power supply circuit 30A is connected between the output terminals of the rectifier circuit DB1. The power supply circuit 30A converts the pulsating voltage supplied from the rectifier circuit DB1 into a DC voltage with a predetermined voltage value and supplies the DC voltage to the main control circuit 21, the sub-control circuit 22, and other circuits. That is to say, the power supply circuit 30A receives power from the AC power supply 2 via the first terminal T1 and the second terminal T21 and supplies the power to the main control circuit 21, the sub-control circuit 22, and other circuits.

In addition, another rectifier circuit DB2 is connected between the first terminal T1 and the second terminal T22. The rectifier circuit DB2 rectifies the AC voltage Vac supplied via the first terminal T1 and the second terminal T22. The insulating power supply circuit 30C is connected between the output terminals of the rectifier circuit DB2. The insulating power supply circuit 30C converts the pulsating voltage supplied from the rectifier circuit DB2 into a DC voltage with a predetermined voltage value and supplies the DC voltage to the main control circuit 21, the sub-control circuit 22, and other circuits. That is to say, the insulating power supply circuit 30C receives power from the AC power supply 2 via the first terminal T1 and the second terminal T22 and supplies the power to the main control circuit 21, the sub-control circuit 22, and other circuits. Note that the insulating power supply circuit 30C electrically insulates an input-side circuit section from an output-side circuit section using an electromagnetic coupling element such as a transformer. Thus, the ground on the input side of the insulating power supply circuit 30C is different from the ground on the output side of the insulating power supply circuit 30C (i.e., the ground of the power supply circuit 30A).

In this variation, the ground of the power supply circuit 30A is used in common as the ground of the switch circuit 101, and therefore, the sub-control circuit 22 supplied with power from the power supply circuit 30A directly receives the detection signals from the zero-crossing detection units 231, 232. On the other hand, the ground of the power supply circuit 30A is different from the ground of the switch circuit 102 (i.e., the ground on the input side of the insulating power supply circuit 30C), and therefore, the sub-control circuit 22 receives the detection signals from the zero-crossing detection units 241, 242 via the insulating circuit 255.

The sub-control circuit 22 controls the switch 11 of the switch circuit 101 in accordance with a control signal supplied from the main control circuit 21 and detection signals supplied from the zero-crossing detection units 231, 232, thereby turning the load 3A ON with its dimming level controlled. In addition, the sub-control circuit 22 also controls the switch 11 of the switch circuit 102 in accordance with the control signal supplied from the main control circuit 21 and detection signals supplied from the zero-crossing detection units 241, 242, thereby turning the load 3B ON with its dimming level controlled. The sub-control circuit 22 performs the operation of turning the loads 3A, 3B ON with their dimming level controlled in the same way as described above for the exemplary embodiment, and description thereof will be omitted herein.

In this variation, the power supply circuit 30 includes the power supply circuit 30A for receiving power from the AC power supply 2 via the first terminal T1 and the second terminal T21 and the insulating power supply circuit 30C for receiving power from the AC power supply 2 via the first terminal T1 and the second terminal T22.

This allows, when the load 3A is connected between the first terminal T1 and the second terminal T21, power to be supplied from the power supply circuit 30A to the main control circuit 21, the sub-control circuit 22, and other circuits.

On the other hand, under no-load conditions where the load 3A is not connected between the first terminal T1 and the second terminal T21, the power supply circuit 30A cannot receive power from the AC power supply but power is supplied from the insulating power supply circuit 30C to the main control circuit 21, the sub-control circuit 22, and other circuits. As can be seen, when the electrical path between the first terminal T1 and the second terminal T21 has fallen into no-load conditions, the insulating power supply circuit 30C supplies power to the main control circuit 21, the sub-control circuit 22, and other circuits. This allows the main control circuit 21 and the sub-control circuit 22 to continue to operate and turn the load 3B ON with its dimming level controlled.

As can be seen from the foregoing description, in the load control system 1 according to the sixth variation, the power supply circuit 30 includes a plurality of power supply circuits (namely, the power supply circuit 30A and the insulating power supply circuit 30C) associated one to one with the plurality of switch circuits 10. When there is any second terminal T2 under no-load conditions among the plurality of second terminals T2, the power supply circuit 30 receives power from the AC power supply 2 via any of the other second terminals T2 and the first terminal T1 and generates power to be supplied to circuits including the control circuit 20. This allows, even if any of the plurality of loads 3 turns into no-load conditions, the power supply circuit 30 to receive power from the first terminal T1 and the second terminal T2, to which the load 3 is connected normally, and generate power to be supplied to the circuits including the control circuit 20.

(4.7) Seventh Variation

Figure 14:
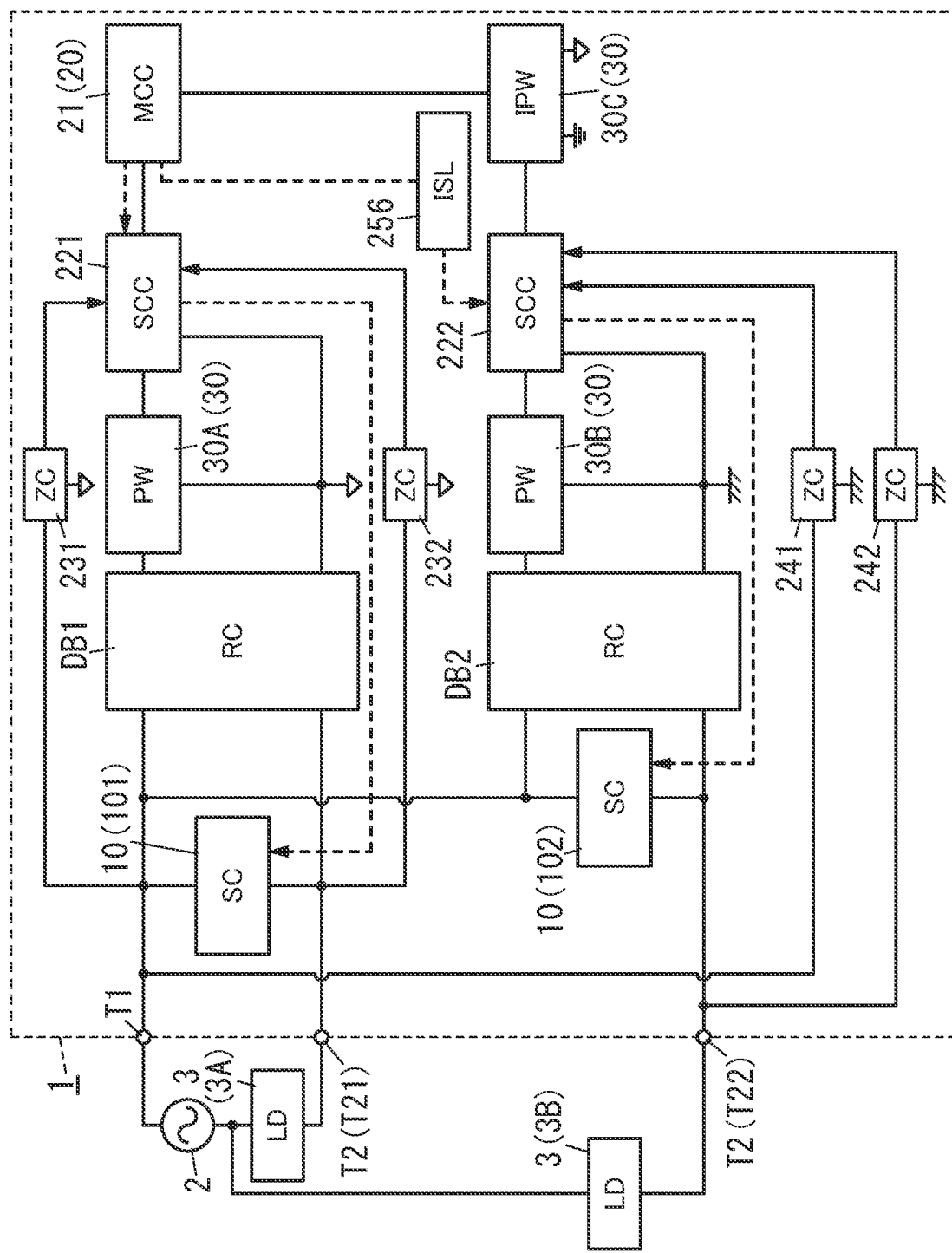
FIG. 14 is a schematic circuit diagram of a load control system according to a seventh variation of the exemplary embodiment of the present disclosure.

A load control system 1 according to a seventh variation includes: power supply circuits 30A, 30B provided for the switch circuits 101, 102, respectively; sub-control circuits 221, 222 provided for the switch circuits 101, 102, respectively; and an insulating power supply circuit 30C for backup as shown in FIG. 14, which is a major difference from the sixth variation described above. In the following description, any constituent element of the seventh variation, having the same function as a counterpart of the exemplary embodiment described above, will be designated by the same reference numeral as that counterpart's, and description thereof will be omitted herein as appropriate. Note that in FIG. 14, illustration of the interface unit 40 and the control master device 5 is omitted.

The rectifier circuit DB1 is connected between the first terminal T1 and the second terminal T21. The rectifier circuit DB1 rectifies the AC voltage Vac supplied via the first terminal T1 and the second terminal T21. The power supply circuit 30A is connected between the output terminals of the rectifier circuit DB1. The power supply circuit 30A converts the pulsating voltage supplied from the rectifier circuit DB1 into a DC voltage with a predetermined voltage value and supplies the DC voltage to the main control circuit 21, the sub-control circuit 221, and other circuits. That is to say, the power supply circuit 30A receives power from the AC power supply 2 via the first terminal T1 and the second terminal T21 and supplies the power to the main control circuit 21, the sub-control circuit 221, and other circuits.

In addition, the rectifier circuit DB2 is connected between the first terminal T1 and the second terminal T22. The rectifier circuit DB2 rectifies the AC voltage Vac supplied via the first terminal T1 and the second terminal T22. The power supply circuit 30B is connected between the output terminals of the rectifier circuit DB2. The power supply circuit 30B converts the pulsating voltage supplied from the rectifier circuit DB2 into a DC voltage with a predetermined voltage value and supplies the DC voltage to the sub-control circuit 222, the insulating power supply circuit 30C, and other circuits. That is to say, the power supply circuit 30B receives power from the AC power supply 2 via the first terminal T1 and the second terminal T22 and supplies the power to the sub-control circuit 222, the insulating power supply circuit 30C, and other circuits. The insulating power supply circuit 30C receives power from the power supply circuit 30B and supplies the power to the main control circuit 21. Note that the insulating power supply circuit 30C electrically insulates an input-side circuit section from an output-side circuit section. Thus, the ground on the input side of the insulating power supply circuit 30C is different from the ground on the output side of the insulating power supply circuit 30C (i.e., the ground of the main control circuit 21).

In this variation, the ground of the power supply circuit 30A is used in common as the ground of the switch circuit 101, and therefore, the sub-control circuit 221 supplied with power from the power supply circuit 30A directly receives the detection signals from the zero-crossing detection units 231, 232. In addition, the ground of the power supply circuit 30B is used in common as the ground of the switch circuit 102, and therefore, the sub-control circuit 222 supplied with power from the power supply circuit 30B directly receives the detection signals from the zero-crossing detection units 241, 242.

The sub-control circuit 221 controls the switch 11 of the switch circuit 101 in accordance with a control signal supplied from the main control circuit 21 and detection signals supplied from the zero-crossing detection units 231, 232, thereby turning the load 3A ON with its dimming level controlled. Meanwhile, the sub-control circuit 222 controls the switch 11 of the switch circuit 102 in accordance with a control signal supplied from the main control circuit 21 via the insulating circuit 256 and detection signals supplied from the zero-crossing detection units 241, 242, thereby turning the load 3B ON with its dimming level controlled. The sub-control circuits 221, 222 perform the operation of turning the loads 3A, 3B ON with their dimming level controlled in the same way as already described for the exemplary embodiment, and description thereof will be omitted herein.

In the load control system 1 according to this seventh variation, the power supply circuit 30 includes the power supply circuit 30A for receiving power from the AC power supply 2 via the first terminal T1 and the second terminal T21 and the power supply circuit 30B and the insulating power supply circuit 30C for receiving power from the AC power supply 2 via the first terminal T1 and the second terminal T22.

This allows, when the load 3A is connected between the first terminal T1 and the second terminal T21, power to be supplied from the power supply circuit 30A to the main control circuit 21 and the sub-control circuit 221.

On the other hand, under no-load conditions where the load 3A is not connected between the first terminal T1 and the second terminal T21, the power supply circuit 30A cannot receive power from the AC power supply but power is supplied from the insulating power supply circuit 30C to the main control circuit 21. As can be seen, when the electrical path between the first terminal T1 and the second terminal T21 has fallen into no-load conditions, the insulating power supply circuit 30C supplies power to the main control circuit 21. This allows the main control circuit 21 and the sub-control circuit 222 to continue to operate and turn the load 3B ON with its dimming level controlled.

(4.8) Eighth Variation

Figure 15:
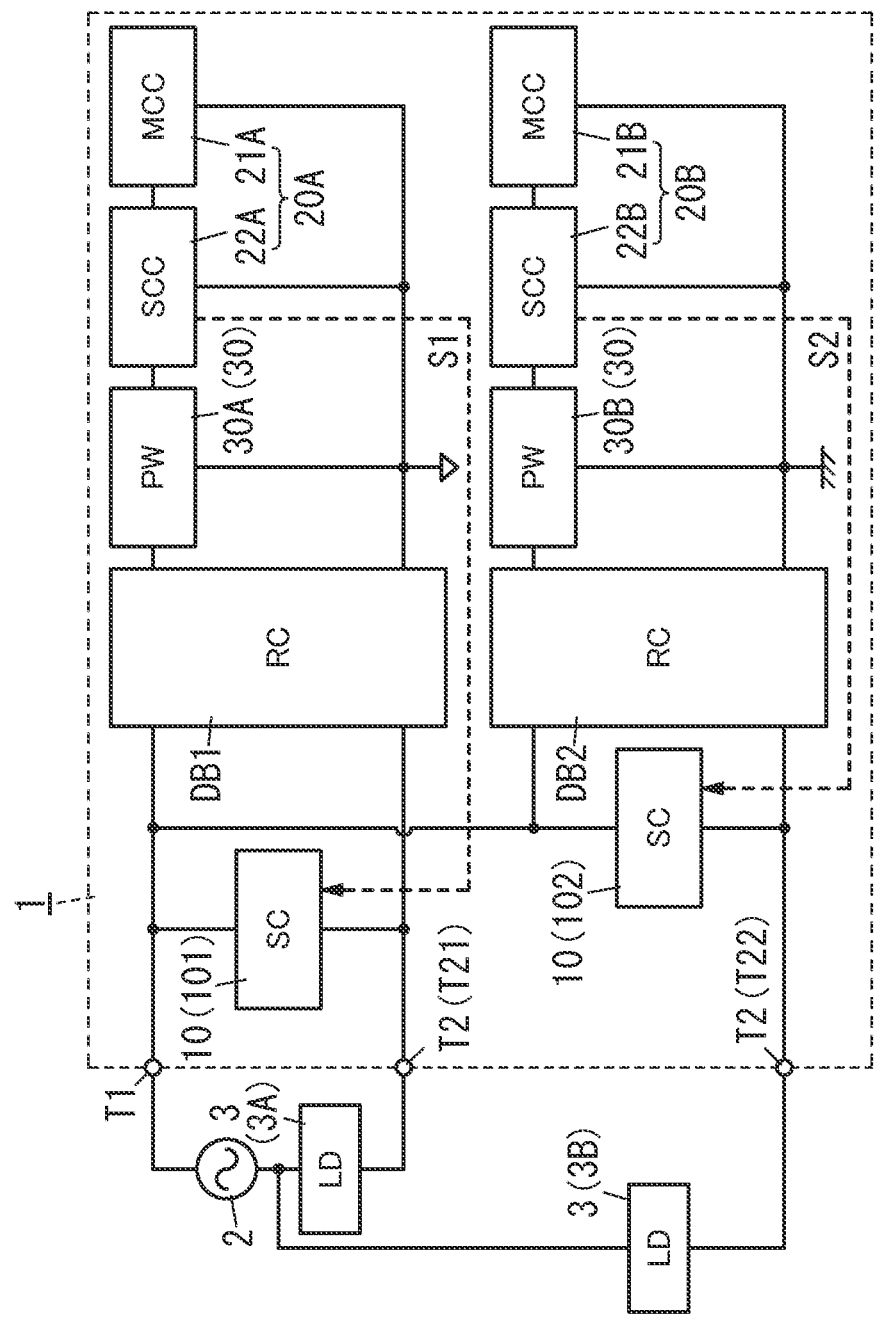
FIG. 15 is a schematic circuit diagram of a load control system according to an eighth variation of the exemplary embodiment of the present disclosure.

A load control system 1 according to an eighth variation includes: power supply circuits 30A, 30B provided for the switch circuits 101, 102, respectively; and control circuits 20A, 20B also provided for the switch circuits 101, 102, respectively, as shown in FIG. 15, which is a major difference from the exemplary embodiment described above. In the following description, any constituent element of the eighth variation, having the same function as a counterpart of the exemplary embodiment described above, will be designated by the same reference numeral as that counterpart's, and description thereof will be omitted herein as appropriate. Note that in FIG. 15, illustration of the interface unit 40 and the control master device 5 is omitted.

In this variation, the switch circuit 10, the power supply circuit 30, and the control circuit 20 are provided between each of the plurality of second terminals T2 and the first terminal T1. That is to say, the switch circuit 10, the power supply circuit 30, and the control circuit 20 are provided independently for each load 3.

This allows, even if any of the plurality of loads 3 turns into no-load conditions, the power supply circuit 30 electrically connected to the first terminal T1 and the second terminal T2, to which the load 3 is connected normally, to receive power from the AC power supply 2 and supply the power to the control circuit 20. Thus, the control circuit 20 may control the supply of power to the load 3 by controlling its associated switch circuit 10.

(Resume)

As can be seen from the foregoing description, a load control system (1) according to a first aspect includes a first terminal (T1), a plurality of second terminals (T2), a plurality of switch circuits (10), a control circuit (20), and a power supply circuit (30). The first terminal (T1) is configured to be electrically connected to a power supply (2). The plurality of second terminals (T2) are associated one to one with a plurality of loads (3). Each of the plurality of second terminals (T2) is configured to be electrically connected to the power supply (2) via an associated one load (3) out of the plurality of loads (3). The plurality of switch circuits (10) are associated one to one with the plurality of second terminals (T2). Each of the plurality of switch circuits (10) includes a switch (11) electrically connected between the first terminal (T1) and an associated one second terminal (T2) out of the plurality of second terminals (T2). The control circuit (20) controls the switch (11) that each of the plurality of switch circuits (10) includes and thereby controls supply of power to the load (3) associated with each of the plurality of switch circuits (10). The power supply circuit (30) is electrically connected between the plurality of second terminals (T2) and the first terminal (T1) and receives power from the power supply (2) via the first terminal (T1) and at least one second terminal (T2) out of the plurality of second terminals (T2) and thereby generates power to be supplied to at least the control circuit (20).

According to this aspect, a plurality of loads (3) are connected between the respective second terminals (T2) and the first terminal (T1), thus reducing the number of electric wires to connect the plurality of loads (3) compared to connecting the power supply (2) to each of the plurality of loads (3) via two electric wires. In addition, the control circuit (20) controls the supply of power to the loads (3) associated the plurality of switch circuits (10) by controlling the switch (11) of each switch circuit (10), thus allowing the supply of power to the plurality of loads (3) to be controlled on an individual basis.

In a load control system (1) according to a second aspect, which may be implemented in conjunction with the first aspect, at least one of the control circuit (20) or the power supply circuit (30) includes a common circuit (21, 31). The common circuit (21, 31) is used in common by the plurality of switch circuits (10).

This aspect allows the circuit scale to be reduced by having the common circuit (21, 31) used in common by the plurality of switch circuits (10).

In a load control system (1) according to a third aspect, which may be implemented in conjunction with the second aspect, the control circuit (20) includes a main control circuit (21) and a plurality of sub-control circuits (22, 221, 222). The plurality of sub-control circuits (22, 221, 222) are associated one to one with the plurality of switch circuits (10). The main control circuit (21) controls the plurality of sub-control circuits (22, 221, 222). Each of the plurality of sub-control circuits (22, 221, 222) controls the switch (11) of an associated one switch circuit (10) out of the plurality of switch circuits (10). The power supply circuit (30) includes a main power supply circuit (31) and a plurality of sub-power supply circuits (321, 322). The plurality of sub-power supply circuits (321, 322) are associated one to one with the plurality of sub-control circuits (22, 221, 222). The main power supply circuit (31) supplies power to the main control circuit (21). Each of the plurality of sub-power supply circuits (321, 322) supplies power to an associated one sub-control circuit (22, 221, 222) out of the plurality of sub-control circuits (22, 221, 222).

This aspect allows the circuit scale to be reduced by having the main control circuit (21) and the main power supply circuit (31) used in common by the plurality of switch circuits (10).

In a load control system (1) according to a fourth aspect, which may be implemented in conjunction with the second aspect, the control circuit (20) includes a main control circuit (21) and a plurality of sub-control circuits (22, 221, 222). The plurality of sub-control circuits (22, 221, 222) are associated one to one with the plurality of switch circuits (10). The main control circuit (21) controls the plurality of sub-control circuits (22, 221, 222). Each of the plurality of sub-control circuits (22, 221, 222) controls the switch (11) of an associated one switch circuit (10) out of the plurality of switch circuits (10).

This aspect allows the circuit scale to be reduced by having the main control circuit (21) used in common by the plurality of switch circuits (10).

A load control system (1) according to a fifth aspect, which may be implemented in conjunction with any one of the first to fourth aspects, further includes an insulating circuit (251, 252) to electrically insulate at least one of the control circuit (20) or the power supply circuit (30) from at least any one of the plurality of switch circuits (10).

This aspect allows the circuit to operate normally by making the insulating circuit (251, 252) electrically insulate at least one of the control circuit (20) or the power supply circuit (30) from at least one of the plurality of switch circuits (10).

In a load control system (1) according to a sixth aspect, which may be implemented in conjunction with any one of the first to fourth aspects, the plurality of switch circuits (10) are electrically insulated from neither the control circuit (20) nor the power supply circuit (30).

This aspect eliminates the need to provide any insulating circuit.

A load control system (1) according to a seventh aspect, which may be implemented in conjunction with any one of the first to sixth aspects, further includes an on-off switch (SW1) electrically connected between one second terminal (T2) out of the plurality of second terminals (T2) and the power supply circuit (30). The control circuit (20) turns the on-off switch (SW1) OFF when one second terminal (T2), to which the on-off switch (SW1) is connected, out of the plurality of second terminals (T2) is under no-load conditions.

This aspect allows the second terminal (T2) under no-load conditions to be electrically cut off from the power supply circuit (30) by turning the on-off switch (SW1) OFF under no-load conditions.

In a load control system (1) according to an eighth aspect, which may be implemented in conjunction with any one of the first to seventh aspects, the power supply circuit (30) receives power from the power supply (2) via the first terminal (T1) and any second terminal (T2) out of the plurality of second terminals (T2).

This aspect allows, when any of the plurality of second terminals (T2) falls into no-load conditions, the power supply circuit (30) to receive power from the power supply (2) via the first terminal (T1) and the other second terminals (T2).

In a load control system (1) according to a ninth aspect, which may be implemented in conjunction with any one of the first to eighth aspects, the power supply circuit (30) receives, when a particular one of the plurality of second terminals (T2) is under no-load conditions, power from the power supply (2) via the first terminal (T1) and predetermined terminals. The predetermined terminals herein refer to the rest of the plurality of second terminals (T2) other than the particular one of the plurality of second terminals (T2).

This aspect allows, when any of the plurality of second terminals (T2) falls into no-load conditions, the power supply circuit (30) to receive power from the power supply (2) via the first terminal (T1) and the other second terminals (T2).

A load control system (1) according to a tenth aspect, which may be implemented in conjunction with any one of the first to ninth aspects, further includes a first circuit block (B1) and a plurality of second circuit blocks (B21, B22). Each of the plurality of second circuit blocks (B21, B22) includes a second connection node (82, 83) to be electrically connected to a first connection node (81) that the first circuit block (B1) includes. Each of the plurality of second circuit blocks (B21, B22) is electrically connected to the first circuit block (B1) via the second connection node (82, 83). The first circuit block (B1) includes a first housing (91) to house circuits including at least a part of the control circuit (20) and at least a part of the power supply circuit (30). The plurality of second circuit blocks (B21, B22) are associated one to one with the plurality of switch circuits (10). Each of the plurality of second circuit blocks (B21, B22) includes a second housing (921, 922) to house an associated one switch circuit (10) out of the plurality of switch circuits (10).

This aspect allows the load control system (1) to be formed by connecting the first circuit block (B1) to the plurality of second circuit blocks (B21, B22).

A load control system (1) according to an eleventh aspect, which may be implemented in conjunction with any one of the first to tenth aspects, further includes a plurality of operating units (40) associated one to one with the plurality of switch circuits (10). The control circuit (20) controls, in response to an operating command entered through one operating unit (40) out of the plurality of operating units (40), ON/OFF states of the switch (11) that one switch circuit (10), associated with the one operating unit (40), out of the plurality of switch circuits (10) includes.

This aspect allows the supply of power to any desired load (3) to be controlled by making the user operate the operating unit (40).

Note that constituent elements according to the second to eleventh aspects are not essential constituent elements for the load control system (1) but may be omitted as appropriate.

REFERENCE SIGNS LIST

1 Load Control System
2 AC Power Supply (Power Supply)
3 (3A, 3B) Load
10 (101, 102) Switch Circuit
11 Switch 20 Control Circuit
21 Main Control Circuit
22, 221, 222 Sub-Control Circuit
30 Power Supply Circuit
31 Main Power Supply Circuit
32, 321, 322 Sub-Power Supply Circuit
40 Interface Unit (Operating Unit)
81 First Connection Node
82, 83 Second Connection Node
91 First Housing
251, 252 Insulating Circuit
921, 922 Second Housing
B1 First Circuit Block
B21, B22 Second Circuit Block
SW1 Switch (On-Off Switch)
T1 First Terminal
T2, T21, T22 Second Terminal

The invention claimed is:

1. A load control system comprising a first terminal, a plurality of second terminals, a plurality of switch circuits, a control circuit, and a power supply circuit, wherein
the first terminal is configured to be electrically connected to a power supply,
the plurality of second terminals are associated one to one with a plurality of loads,
each of the plurality of second terminals is configured to be electrically connected to the power supply via an associated one of the plurality of loads,
the plurality of switch circuits are associated one to one with the plurality of second terminals,
each of the plurality of switch circuits includes a switch electrically connected between the first terminal and an associated one of the plurality of second terminals,
the control circuit is configured to control the switch that each of the plurality of switch circuits includes and thereby control supply of power to the load associated with each of the plurality of switch circuits, and
the power supply circuit is electrically connected between the plurality of second terminals and the first terminal and configured to receive power from the power supply via the first terminal and at least one of the plurality of second terminals and thereby generate power to be supplied to at least the control circuit.

2. The load control system of claim 1, wherein
at least one of the control circuit or the power supply circuit includes a common circuit, and
the common circuit is used in common by the plurality of switch circuits.

3. The load control system of claim 2, wherein
the control circuit includes a main control circuit and a plurality of sub-control circuits,
the plurality of sub-control circuits are associated one to one with the plurality of switch circuits,
the main control circuit is configured to control the plurality of sub-control circuits,
each of the plurality of sub-control circuits is configured to control the switch of an associated one of the plurality of switch circuits,
the power supply circuit includes a main power supply circuit and a plurality of sub-power supply circuits,
the plurality of sub-power supply circuits are associated one to one with the plurality of sub-control circuits,
the main power supply circuit is configured to supply power to the main control circuit, and
each of the plurality of sub-power supply circuits is configured to supply power to an associated one of the plurality of sub-control circuits.

4. The load control system of claim 3, further comprising an insulating circuit configured to electrically insulate at least one of the control circuit or the power supply circuit from at least any one of the plurality of switch circuits.

5. The load control system of claim 3, wherein
the plurality of switch circuits are electrically insulated from neither the control circuit nor the power supply circuit.

6. The load control system of claim 2, wherein
the control circuit includes a main control circuit and a plurality of sub-control circuits,
the plurality of sub-control circuits are associated one to one with the plurality of switch circuits,
the main control circuit is configured to control the plurality of sub-control circuits, and
each of the plurality of sub-control circuits is configured to control the switch of an associated one of the plurality of switch circuits.

7. The load control system of claim 6, further comprising an insulating circuit configured to electrically insulate at least one of the control circuit or the power supply circuit from at least any one of the plurality of switch circuits.

8. The load control system of claim 6, wherein
the plurality of switch circuits are electrically insulated from neither the control circuit nor the power supply circuit.

9. The load control system of claim 2, further comprising an insulating circuit configured to electrically insulate at least one of the control circuit or the power supply circuit from at least any one of the plurality of switch circuits.

10. The load control system of claim 2, wherein
the plurality of switch circuits are electrically insulated from neither the control circuit nor the power supply circuit.

11. The load control system of claim 1, further comprising an insulating circuit configured to electrically insulate at least one of the control circuit or the power supply circuit from at least any one of the plurality of switch circuits.

12. The load control system of claim 1, wherein
the plurality of switch circuits are electrically insulated from neither the control circuit nor the power supply circuit.

13. The load control system of claim 1, further comprising an on-off switch electrically connected between one of the plurality of second terminals and the power supply circuit, wherein
the control circuit is configured to turn the on-off switch OFF when one second terminal, to which the on-off switch is connected, out of the plurality of second terminals is under no-load conditions.

14. The load control system of claim 1, wherein
the power supply circuit is configured to receive power from the power supply via the first terminal and any one of the plurality of second terminals.

15. The load control system of claim 1, wherein
the power supply circuit is configured to, when a particular one of the plurality of second terminals is under no-load conditions, receive power from the power supply via the first terminal and the rest of the plurality of second terminals other than the particular one of the plurality of second terminals.

16. The load control system of claim 1, further comprising a first circuit block and a plurality of second circuit blocks,
each of the plurality of second circuit blocks includes a second connection node to be electrically connected to a first connection node and is electrically connected to the first circuit block via the second connection node, the first connection node being included in the first circuit block, the first circuit block includes a first housing configured to house circuits including at least a part of the control circuit and at least a part of the power supply circuit, the plurality of second circuit blocks are associated one to one with the plurality of switch circuits, and each of the plurality of second circuit blocks includes a second housing configured to house an associated one of the plurality of switch circuits.

17. The load control system of claim 1, further comprising a plurality of operating units associated one to one with the plurality of switch circuits, wherein the control circuit is configured to, in response to an operating command entered through one of the plurality of operating units, control ON/OFF states of the switch that one switch circuit, associated with the one operating unit, out of the plurality of switch circuits includes.

* * * * *